(12) United States Patent
Sueoka et al.

(10) Patent No.: US 7,470,311 B2
(45) Date of Patent: Dec. 30, 2008

(54) DEHUMIDIFICATION UNIT AND ADSORPTION ELEMENT FOR USE IN SUCH A DEHUMIDIFICATION UNIT

(75) Inventors: Takahisa Sueoka, Osaka (JP); Guannan Xi, Osaka (JP); Akira Kamino, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 757 days.

(21) Appl. No.: 10/521,561

(22) PCT Filed: Jul. 22, 2002

(86) PCT No.: PCT/JP02/07377

§ 371 (c)(1),
(2), (4) Date: Jan. 19, 2005

(87) PCT Pub. No.: WO2004/010055

PCT Pub. Date: Jan. 29, 2004

(65) Prior Publication Data

US 2006/0086125 A1    Apr. 27, 2006

(51) Int. Cl.
*F24F 3/14* (2006.01)
*B01D 53/04* (2006.01)

(52) U.S. Cl. .............................. 96/129; 96/154; 62/271

(58) Field of Classification Search .................... 62/3.4, 62/93, 94, 271, 304; 96/108, 126, 129, 152, 96/154
See application file for complete search history.

(56) References Cited

U.S. PATENT DOCUMENTS

| | | | |
|---|---|---|---|
| 4,391,616 A * | 7/1983 | Imamura | 95/92 |
| 4,429,735 A * | 2/1984 | Nomaguchi et al. | 165/60 |
| 5,226,298 A * | 7/1993 | Yamamoto et al. | 62/3.4 |
| 5,580,370 A | 12/1996 | Kuma et al. | |
| 5,775,121 A * | 7/1998 | Kuma et al. | 62/314 |
| 5,913,360 A * | 6/1999 | Stark | 165/66 |
| 6,536,514 B1 * | 3/2003 | Sugiyama et al. | 165/166 |
| 2005/0235673 A1 * | 10/2005 | Sueoka et al. | 62/271 |

FOREIGN PATENT DOCUMENTS

| | | |
|---|---|---|
| CN | 2423555Y Y | 3/2001 |
| JP | 53-122361 U | 10/1978 |
| JP | 55-030488 U | 3/1980 |
| JP | 55-39434 A | 3/1980 |
| JP | 56-17622 A | 2/1981 |
| JP | 56-132471 A | 10/1981 |
| JP | 8-313186 A | 11/1996 |

* cited by examiner

*Primary Examiner*—Frank M Lawrence
(74) *Attorney, Agent, or Firm*—Birch, Stewart, Kolasch & Birch, LLP

(57) ABSTRACT

A dehumidification unit comprised of alternate laminations of an adsorption element which supports an adsorbent and which is provided with a first air ventilation passage and a cooling element, which is provided with a second air ventilation passage. The first air ventilation passage of the adsorption element and the second air ventilation passage of the cooling element are adjacently formed, with a single plate member lying between the first and second air ventilation passages. As a result of such arrangement, as compared with a structure formed with two plate members lying therebetween second air ventilation passages, the performance of heat transfer between the air ventilation passages is further improved, whereby the dehumidification capability of the dehumidification unit is maintained at high levels over a long period of time.

13 Claims, 20 Drawing Sheets

PRIOR ART

PRIOR ART

DEHUMIDIFICATION UNIT AND ADSORPTION ELEMENT FOR USE IN SUCH A DEHUMIDIFICATION UNIT

FIELD OF THE INVENTION

This invention relates to a dehumidification unit for the dehumidification of humid air by making utilization of the adsorptive action of an adsorbent. The present invention relates also to an adsorption element for use in such a dehumidification unit.

BACKGROUND OF THE INVENTION

Dehumidification units making utilization of the adsorptive action of an adsorbent have been known in the prior art. Referring to FIGS. 19 and 20, there is shown a structure of such a conventional dehumidification unit by way of example.

The conventional dehumidification unit $Z_0$ is formed by sequentially laminating an adsorption element 31 having a large number of air ventilation passages 35, 35, . . . each supporting on its interior surface an adsorbent, and a cooling element 41 having a large number of air ventilation passages 45, 45, . . . in a 90-degree plane phase so that the air ventilation passages 35 are approximately orthogonal to the air ventilation passages 45.

And, in the dehumidification unit $Z_0$, humid air (i.e., air to be processed) flows through the air ventilation passages 35, 35, . . . of each adsorption element 31, and, on the other hand, cooling air flows through the air ventilation passages 45, 45, . . . of each cooling element 41. On the side of the adsorption element 31, the moisture contained in the humid air is adsorption-removed by the adsorbent supported on the wall surface of the air ventilation passage 35, and the humid air is changed into a stream of low-humidity air. Meanwhile, heat of adsorption, generated by such moisture adsorption on the side of the adsorption element 31, is absorbed by heat exchange with the cooling air flowing through the air ventilation passage 45 of the cooling element 41. As the result of this, the adsorption capability of the adsorbent will be maintained at satisfactory levels over a long period of time.

And now, as shown in FIGS. 19 and 20, the conventional dehumidification unit $Z_0$ is made up of the adsorption elements 31 and the cooling elements 41, and each adsorption element 31 is composed of an air ventilation passage forming member 32 bent in the shape of a corrugated plate, and a pair of tabular side-plate members 33, 33 respectively firmly attached to both sides of the air ventilation passage forming member 32. Both the air ventilation passage forming member 32 and the side-plate members 33, 33 are formed of fiber paper made of ceramic fibers, and an adsorbent, such as silica gel etcetera, is supported on their surface.

On the other hand, each cooling element 41 is made up of an air ventilation passage forming member 42 bent in the shape of a corrugated plate, and a pair of tabular side-plate members 43, 43 respectively firmly attached to both sides of the air ventilation passage forming member 42. Both the air ventilation passage forming member 42 and the side-plate members 43, 43 are formed by a sheet metal (thin metallic plate) made of aluminum etcetera.

Problems to be Solved

Meanwhile, in the dehumidification unit $Z_0$ formed by sequential laminations of the adsorption element 31 and the cooling element 41, the air ventilation passage 35 on the side of the adsorption element 31 and the air ventilation passage 45 on the side of the cooling element 41 are adjacently formed, with a two-ply wall part (formed by attachment of one of the side-plate members 33, 33 of the adsorption element 31 to one of the side-plate members 43, 43 of the cooling element 41) lying between the air ventilation passage 35 and the air ventilation passage 45 (see FIG. 20). Accordingly, heat exchange between the humid air on the side of the air ventilation passage 35 of the adsorption element 31 and the cooling air on the side of the air ventilation passage 45 of the cooling element 41, i.e., heat transfer from the adsorption element 31 towards the cooling element 41, is always conducted through the aforesaid two-ply wall part made up of the side-plate members 33, 43.

As the result of this, heat-transfer resistance is high during the time of heat transfer between the adsorption element 31 and the cooling element 41, because of which the capability of removal of heat of adsorption by the use of cooling air declines. This results in inviting a drop in the dehumidification capability of the dehumidification unit. Therefore, there is still room for improvement in maintaining the dehumidification capability of the dehumidification unit.

In view of the above, the present invention was made. Accordingly, an object of the present invention is to provide a dehumidification unit capable of maintaining its dehumidification capability at high levels over a long period of time by accomplishing improvement in the performance of heat transfer between the adsorption element and the cooling element, and to provide an adsorption element suitable for use in such a dehumidification unit.

SUMMARY OF THE INVENTION

The present invention employs the following configurations as specific means capable of providing solutions to the above-described problems.

A first invention of the present application provides a dehumidification unit comprising alternate laminations of an adsorption element 1 which supports an adsorbent and which is provided with a first air ventilation passage 3 through which air (Aa) to be processed is passed, and a cooling element 2 which is provided with a second air ventilation passage 4 through which cooling air (Ab) is passed, and the dehumidification unit of the first invention is characterized in that the first air ventilation passage 3 of the adsorption element 1 and the second air ventilation passage 4 of the cooling element 2 are adjacently formed, with a single plate member P lying between the first air ventilation passage 3 and the second air ventilation passage 4.

In a second invention of the present application, there is provided a dehumidification unit according to the first invention, which is characterized in that the plate member P is a side-plate member 12 which is made of fiber paper and which constitutes a side wall of the adsorption element 1 relative to the lamination direction thereof, and that the side-plate member 12 directly faces the second air ventilation passage 4 of the cooling element 2 and, in addition, a separation sheet layer 14 configured to prevent the passage of gas and liquid is formed on a surface of the side-plate member 12 on the side of the second air ventilation passage 4.

In a third invention of the present application, there is provided a dehumidification unit according to the first invention, which is characterized in that the plate member P is a side-plate member 22 which is formed by a metallic or resinous member and which constitutes a side wall of the cooling element 2 relative to the lamination direction thereof, and that the side-plate member 22 directly faces the first air ventilation passage 3 of the adsorption element 1.

In a fourth invention of the present application, there is provided a dehumidification unit according to the first invention, which is characterized in that the plate member P is a side-plate member 16 which is formed by a metallic or resinous member and which constitutes a side wall of the adsorption element 1 relative to the lamination direction thereof, and that an absorbent is supported on a surface of the side-plate member 16 which faces the first air ventilation passage 3.

In a fifth invention of the present application, there is provided a dehumidification unit according to any one of the first to fourth inventions, which is characterized in that an air ventilation passage forming member 21 of the cooling element 2 is formed by a bending plate member shaped like a corrugated plate.

In a sixth invention of the present application, there is provided a dehumidification unit according to any one of the first to fourth inventions, which is characterized in that an air ventilation passage forming member 21 of the cooling element 2 is formed by a bending plate member shaped like a trapezoidally corrugated plate.

In a seventh invention of the present application, there is provided a dehumidification unit according to any one of the first to fourth inventions, which is characterized in that an air ventilation passage forming member 21 of the cooling element 2 is made up of a plurality of partition walls 23 vertically arranged in the thickness direction of the cooling element 2.

In an eighth invention of the present application, there is provided a dehumidification unit according to the second invention, which is characterized in that the separation sheet layer 14 is formed by attachment of a plastic film, by vapor deposition of a metallic material, or by application of an organic binder.

A ninth invention of the present application provides an adsorption element in which a large number of air ventilation passages 3, 3, . . . are formed on the inside of a single pair of tabular side-plate members 12, 12 spacedely opposed to each other and an absorbent is supported on the side of an interior surface of each of the air ventilation passages 3, 3, . . . , and the adsorption element of the ninth invention is characterized in that the side-plate members 12, 12 are each formed of an air and moisture permeable material, and that either or both of exterior surfaces 12a, 12a of the side-plate members 12, 12 are provided with waterproofing means 14.

A tenth invention of the present application provides an adsorption element in which a large number of air ventilation passages 3, 3, . . . are formed at an interior surface 12b of a tabular side-plate member 12 and an absorbent is supported on the side of an interior surface of each of the air ventilation passages 3, 3, . . . , and the adsorption element of the tenth invention is characterized in that the side-plate member 12 is composed of an air and moisture permeable material, and that an exterior surface 12a of the side-plate member 12 is provided with waterproofing means 14.

In an eleventh invention of the present application, there is provided a dehumidification unit according to the ninth invention or to the tenth invention, which is characterized in that as the permeable material of which the side-plate member 12 is formed, ceramic fiber paper, glass fiber paper, flame resistant paper, or nonwoven fabric is used.

In a twelfth invention of the present application, there is provided a dehumidification unit according to the ninth invention or to the tenth invention, which is characterized in that the waterproofing means 14 is formed by attachment of a plastic film to the exterior surface 12a of the side-plate member 12, by application of an organic binder to the exterior surface 12a, or by vapor deposition of a metallic material on the exterior surface 12a.

Finally, in a thirteenth invention of the present application, there is provided a dehumidification unit according to the ninth invention or to the tenth invention, which is characterized in that the waterproofing means 14 is partially provided only in a corresponding area of the exterior surface 12a of the side-plate member 12 to a non waterproofing structure portion of the cooling element 2 which faces the exterior surface 12a.

Effects

By virtue of the above-described arrangements, the present invention provides the following effects.

(a) The first invention of the present application discloses a dehumidification unit comprising alternate laminations of an adsorption element 1 which supports an adsorbent and which is provided with a first air ventilation passage 3 through which air (Aa) to be processed is passed, and a cooling element 2 which is provided with a second air ventilation passage 4 through which cooling air (Ab) is passed, wherein the first air ventilation passage 3 of the adsorption element 1 and the second air ventilation passage 4 of the cooling element 2 are adjacently formed, with a single plate member P lying between the first air ventilation passage 3 and the second air ventilation passage 4. As a result of such arrangement, the performance of heat transfer between the air ventilation passages 3, 4 is further improved as compared with a conventional construction in which the air ventilation passages 3, 4 are adjacently formed, with two sheets of plates laying therebetween, and the action of absorption and removal of heat of adsorption by the cooling air (Ab) is promoted. As a result, the dehumidification capability of the dehumidification unit will be maintained at high levels over a long period of time, thereby contributing to accomplishing improvement in commercial value of the dehumidification unit.

Furthermore, because of the construction that only a single plate member (i.e., the plate member P) is interposed between the first air ventilation passage 3 of the adsorption element 1 and the second air ventilation passage 4 of the cooling element 2, the dehumidification unit is made compact in size relative to its height direction (i.e., the lamination direction of the adsorption element 1 and the cooling element 2) by an amount corresponding to reduction in the number of plate members lying between the first and second air ventilation passages 3, 4, and cost savings are provided because of reduction in the number of component members.

(b) The second invention of the present application discloses a dehumidification unit according to the first invention in which the plate member P is a side-plate member 12 which is made of fiber paper and which constitutes a side wall of the adsorption element 1 relative to the lamination direction thereof, and that the side-plate member 12 directly faces the second air ventilation passage 4 of the cooling element 2 and, in addition, a separation sheet layer 14 configured to prevent the flow of gas and liquid is provided on a surface of the side-plate member 12 on the side of the second air ventilation passage 4. As a result of such arrangement, in spite of employing such a construction that the air ventilation passages 3, 4 are separated from each other by the side-plate member 12 made of fiber paper having gas and liquid permeable properties, these air ventilation passages 3, 4 are completely isolated from each other by the separation sheet layer 14. This therefore ensures that the flow of moisture and air from the air ventilation passage 3 to the air ventilation passage 4 (or vice versa) is prevented, and only heat is allowed to intercommunicate between the air ventilation passages 3, 4. Consequently, the effects as set forth in the above section (a) are attained without fail. Besides, since the plate member P is composed of the side-plate member 12 of fiber paper, further weight and cost savings are attained in comparison, for example, with the case where the plate member P is formed by a metallic member.

(c) The third invention of the present application discloses a dehumidification unit according to the first invention in which the plate member P is a side-plate member 22 which is formed by a metallic or resinous member and which constitutes a side wall of the cooling element 2 relative to the lamination direction thereof, and that the side-plate member 22 directly faces the first air ventilation passage 3 of the adsorption element 1. Needless to say, the effects as set forth in the above section (a) are attained. Additionally, especially when forming the side-plate member 22 from a metallic material, the transfer of heat between the air ventilation passages 3, 4 is further accelerated in comparison with the case where the side-plate member 22 is formed of fiber paper of lower heat transfer rate than the metallic material. Further improvement in the dehumidification capability of the dehumidification unit can be expected.

(d) The fourth invention of the present application discloses a dehumidification unit according to the first invention in which the plate member P is a side-plate member 16 which is formed by a metallic or resinous member and which constitutes a side wall of the adsorption element 1 relative to the lamination direction thereof, and that an absorbent is supported on a surface of the side-plate member 16 which directly faces the first air ventilation passage 3. Needless to say, the effects as set forth in the above section (a) are attained. Additionally, especially when forming the side-plate member 16 from a metallic material, the transfer of heat between the air ventilation passages 3, 4 is further accelerated in comparison with the case where the side-plate member 22 is formed of fiber paper of lower heat transfer rate than the metallic material. Besides, because of the arrangement that the side-plate member 16 directly supports an adsorbent, the efficiency of liberation of heat of adsorption generated in the adsorbent to the cooling air (Ab) is enhanced, thereby producing a synergistic effect that further improvement in the dehumidification capability of the dehumidification unit can be expected.

(e) The dehumidification unit according to the fifth invention of the present application provides, in addition to the effects as set forth in any one of the above sections (a)-(d), the following specific effects. In the fifth invention, the air ventilation passage forming member 21 of the cooling element 2 is formed by a bending plate member shaped like a corrugated plate, thereby facilitating formation of the air ventilation passage forming member 21. The cost of the dehumidification unit is reduced by an amount corresponding to reduction in the formation cost.

(f) The dehumidification unit according to the sixth invention of the present application provides, in addition to the effects as set forth in any one of the above sections (a)-(d), the following specific effects. In the sixth invention, the air ventilation passage forming member 21 of the cooling element 2 is formed by a bending plate member shaped like a trapezoidally corrugated plate. As a result of such arrangement, the cross sectional shape of the second air ventilation passage 4 formed by the air ventilation passage forming member 21 becomes similar to the shape of a rectangle, and the effective cross sectional area thereof (i.e., the cross sectional area of a portion of the second air ventilation passage 4 which effectively functions as an air flowing part) increases correspondingly. As a result, resistance against the flow of the cooling air (Ab) decreases, and the rate of flow thereof increases, whereby the capability of heat-of-adsorption removal by the cooling air (Ab) is enhanced. Accordingly, further improvement in the dehumidification capability of the dehumidification unit can be expected.

(g) The dehumidification unit according to the seventh invention of the present application provides, in addition to the effects as set forth in any one of the above sections (a)-(d), the following specific effects. In the seventh invention, the air ventilation passage forming member 21 of the cooling element 2 is made up of a plurality of partition walls 23 vertically arranged in the thickness direction of the cooling element 2. As a result of such arrangement, further weight savings or cost savings are provided, in comparison, for example, with the case where the air ventilation passage forming member 21 is formed by a bending plate member. Furthermore, it becomes possible to provide lighter-weight and lower-cost dehumidification units.

(h) The dehumidification unit according to the eighth invention of the present application provides, in addition to the effects as set forth in the above section (b), the following specific effects. In the eighth invention, the separation sheet layer 14 is formed by attachment of a plastic film, by vapor deposition of a metallic material, or by application of an organic binder. The specific effects are as follows. For example, when the separation sheet layer 14 is formed by attachment of a plastic film, cost savings are provided since plastic films are a low-cost material. When the separation sheet layer 14 is formed by vapor deposition of a metallic material, the performance of heat transfer is further enhanced because the deposited layer is extremely thin (in other words, the deposited layer hardly becomes heat transfer resistance). When the separation sheet layer 14 is formed by application of an organic binder, cost savings are provided because the operation of such application is easy to carry out.

(i) The ninth invention of the present application discloses an adsorption element in which a large number of air ventilation passages 3, 3, . . . are formed on the inside of a single pair of tabular side-plate members 12, 12 spacedly opposed to each other and an absorbent is supported on the side of an interior surface of each of the air ventilation passages 3, 3, . . ., wherein the side-plate members 12, 12 are each formed of an air and moisture permeable material, and that either or both of exterior surfaces 12a, 12a of the side-plate members 12, 12 are provided with waterproofing means 14.

In the dehumidification unit of the adsorption element of the ninth invention, the pair of the side-plate members 12, 12 are formed of a permeable material and an absorbent is supported on the side of an interior surface of each of the air ventilation passages 3, 3, . . . formed on the inside of each of the side-plate members 12, 12. As a result of such arrangement, the interior surface of each of the air ventilation passages 3, 3, . . . serves as an adsorbent layer with air permeability, and the air (Aa) to be processed flowing through each air ventilation passage 3 easily enters the inside of the adsorbent layer. Therefore, the action of adsorption and removal of the moisture contained in the air (Ab) is carried out efficiently and high adsorption performance is provided.

Meanwhile, the side-plate members 12, 12 are made of a permeable material, due to which, when forming a dehumidification unit by setting cooling elements so as to face both side surfaces of an adsorption element, moisture may travel from the adsorption element to the cooling element. This invites the possibility that not only the cooling capability of the cooling element but also the adsorption capability of the adsorption element drops. In the adsorption element of the ninth invention, however, it is arranged such that either or both of the exterior surfaces 12a, 12a of the side-plate members 12, 12 are provided with the waterproofing means 14. Such arrangement provides the following advantages.

(1) The advantage of the first arrangement that the exterior surfaces 12a, 12a are each provided with the waterproofing means 14 is that, even when the cooling elements respectively facing the exterior surfaces 12a, 12a have no waterproofing structure, the seal properties therebetween are secured by the waterproofing means 14.

(2) The advantage of the second arrangement that either one of the exterior surfaces 12a, 12a is provided with the waterproofing means 14 is that, even when the cooling element facing the exterior surface 12a provided with the waterproofing means 14 has no waterproofing structure, the seal properties therebetween are secured by the waterproofing means 14. As a result, high adsorption performance is attained.

As described above, either or both of the exterior surfaces 12a, 12a of the side-plate members 12, 12 of the adsorption element are provided with the waterproofing means 14, thereby to secure the seal properties between the adsorption element and the opposite cooling element, in other words there is no need for providing a waterproofing structure to the cooling element opposite to the exterior surface 12a provided with the waterproofing means 14. As a result, further improvement in the adsorption performance of the adsorption element can be expected by the arrangement that a part or large part of a lateral member of the cooling element is cut off so as to bring the cooling air (Ab) flowing through the cooling element into direct contact with the side-plate member 12 of the adsorption element for further improvement in the efficiency of heat transfer therebetween.

(j) The tenth invention of the present application provides an adsorption element in which a large number of air ventilation passages 3, 3, . . . are formed at an interior surface 12b of a tabular side-plate member 12 and an absorbent is supported on the side of an interior surface of each of the air ventilation passages 3, 3, . . . , wherein the side-plate member 12 is composed of an air and moisture permeable material, and an exterior surface 12a of the side-plate member 12 is provided with waterproofing means 14.

Accordingly, in the adsorption element of the tenth invention, the side-plate member 12 is formed of a permeable material and, in addition, an absorbent is supported on the interior surface side of each of the air ventilation passages 3, 3, . . . formed on the side of the interior surface 12b of the side-plate member 12. Such arrangement enables the to-be-processed air (Aa) flowing in each of the air ventilation passages 3, 3, . . . to easily enter the inside of the adsorbent layer. As a result, the action of adsorption and removal of the moisture contained in the air (Aa) is accelerated and high adsorption performance is attained accordingly.

Meanwhile, the side-plate member 12 is made of a permeable material, due to which, when forming a dehumidification unit by setting cooling elements so as to face both sides of an adsorption element, moisture may travel from the adsorption element to the cooling element. This invites the possibility that not only the cooling capability of the cooling element but also the adsorption capability of the adsorption element drops. In the adsorption element of the tenth invention, however, the exterior surface 12a of the side-plate member 12 is provided with the waterproofing means 14. As a result of such arrangement, even when the cooling element opposite to the exterior surface 12a provided with the waterproofing means 14 has no waterproofing structure, the seal properties therebetween are secured by the waterproofing means 14, and the adsorption element will demonstrate high adsorption performance.

As described above, the exterior surface 12a of the side-plate member 12 of the adsorption element is provided with the waterproofing means 14, thereby to secure the seal properties between the adsorption element and the opposite cooling element, in other words there is no need for providing a waterproofing structure to the cooling element opposite to the exterior surface 12a provided with the waterproofing means 14. As a result, further improvement in the adsorption performance of the adsorption element can be expected by the arrangement that a part or large part of a lateral member of the cooling element is cut off so as to bring the cooling air (Ab) flowing through the cooling element into direct contact with the side-plate member 12 of the adsorption element for further improvement in the efficiency of heat transfer therebetween.

(k) The adsorption element according to the eleventh invention of the present application provides, in addition to the effects as set forth in any one of the above sections (i) and (j), the following specific effects. In the eleventh invention, as the permeable material of which the side-plate member 12 is composed, ceramic fiber paper, glass fiber paper, flame resistant paper, or nonwoven fabric is used. As a result of such arrangement, further weight savings and cost savings for the side-plate member 12 are provided, in comparison, for example, with the case where the side-plate member 12 is formed using a resinous plate or a metallic plate. Especially, the use reliability of the side-plate member 12 when formed of ceramic fiber paper or of glass fiber paper is upgraded by their flame retardancy. Additionally, when flame resistant paper or nonwoven fabric is used to form the side-plate member 12, this provides further cost savings.

(l) The adsorption element according to the twelfth invention of the present application provides, in addition to the effects as set forth in any one of the above sections (i) and (j), the following specific effects. In the twelfth invention, the waterproofing means 14 is formed by attachment of a plastic film to the exterior surface 12a of the side-plate member 12, by application of an organic binder to the exterior surface 12a, or by vapor deposition of a metallic material on the exterior surface 12a. As a result of such arrangement, the waterproofing means 14 formed by means of any one of the above-described techniques is extremely thin and, in addition, can be formed easily. As a result, when compared with the case where the waterproofing means 14 is formed by a resinous or metallic plate, further reduction in film thickness, weight savings, and cost savings for the adsorption element are provided.

Furthermore, the waterproofing means 14 having any one of the above-described constructions is also formed easily partially in any area or region of the exterior surface 12a of the side-plate member 12 in view of the formation technique thereof. Accordingly, it is possible to set the formation position or range of the waterproofing means 14 according to the structure of a cooling element facing an adsorption element (for example, according to the presence or absence of a waterproofing structure in a side surface of a cooling element or according to the position and range of a waterproofing structure portion in the side surface). As the result of this, the formation range of the waterproofing means 14 is kept to the minimum necessary to make it possible to accomplish further improvement in the efficiency of heat transfer between the adsorption element and the cooling element, and further cost savings.

(m) Finally, the adsorption element according to the thirteenth invention of the present application provides, in addition to the effects as set forth in either one of the above sections (i) and (j), the following specific effects. In the thirteenth invention, the waterproofing means 14 is partially provided only in a corresponding area of the exterior surface 12a of the side-plate member 12 to a non waterproofing structure portion of the cooling element 2 which faces the exterior surface 12a. In comparison, for example, with the case where the waterproofing means 14 is formed all over the exterior surface 12a of the side-plate member 12, the formation range of the waterproofing means 14 in the present invention is smaller and the cost of the adsorption element is reduced correspondingly. Since in the portion where the waterproofing means 14 is provided the cooling air (Ab) on the side of the cooling element is in direct contact with the side-plate member 12, this improves the efficiency of heat transfer between the adsorption element and the cooling element. Accordingly, further improvement in the adsorption performance of the adsorption element will be expected.

DETAILED DESCRIPTION OF THE INVENTION

Hereinbelow, dehumidification units and adsorption elements suitable for use in such dehumidification units according to the present invention will be described more specifically based on their respective embodiments.

A. Dehumidification Unit

I. Embodiment 1

Figure 1:
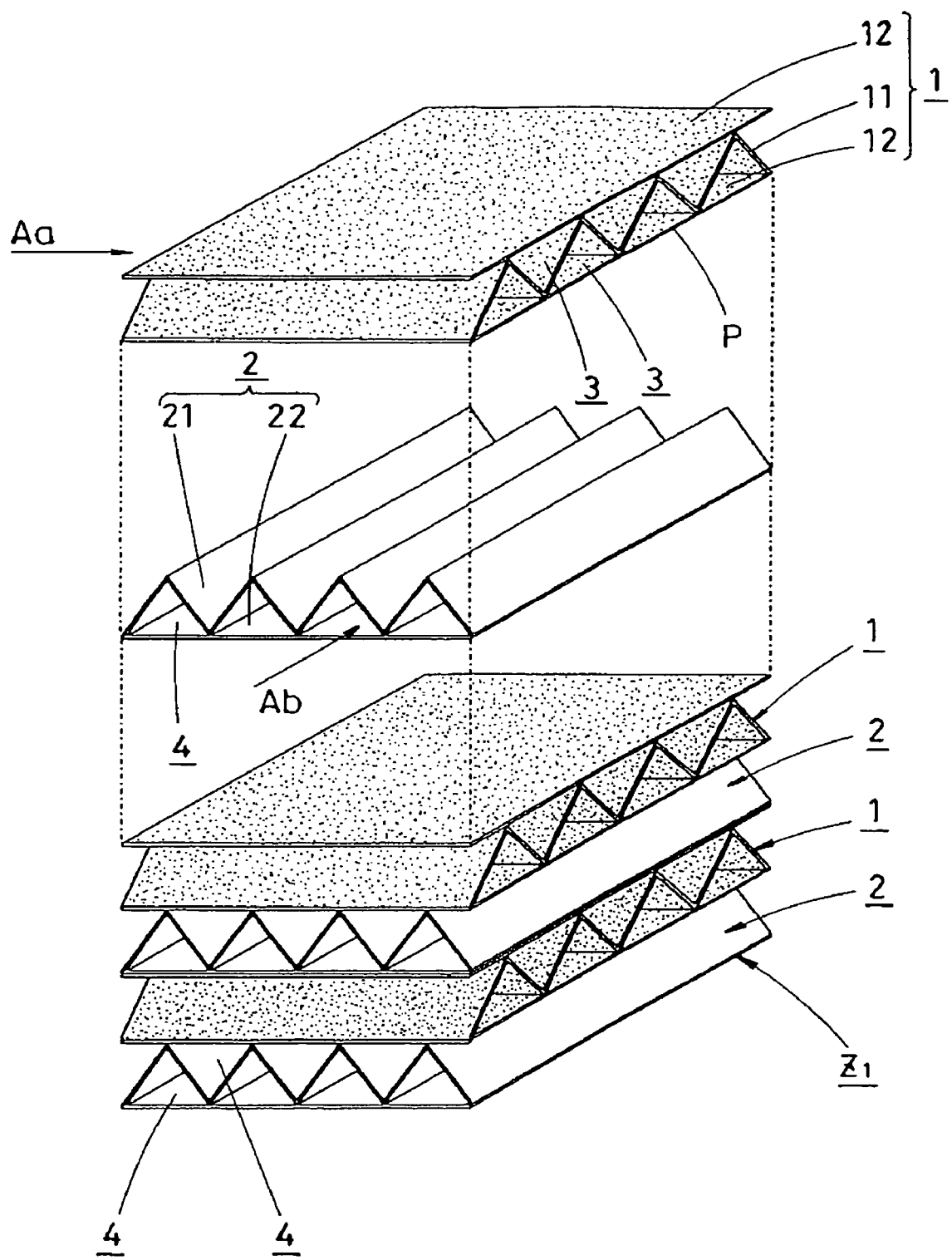
FIG. 1 is a perspective view showing in an exploded manner principal parts of a dehumidification unit according to a first embodiment of the present invention.
Figure 2:
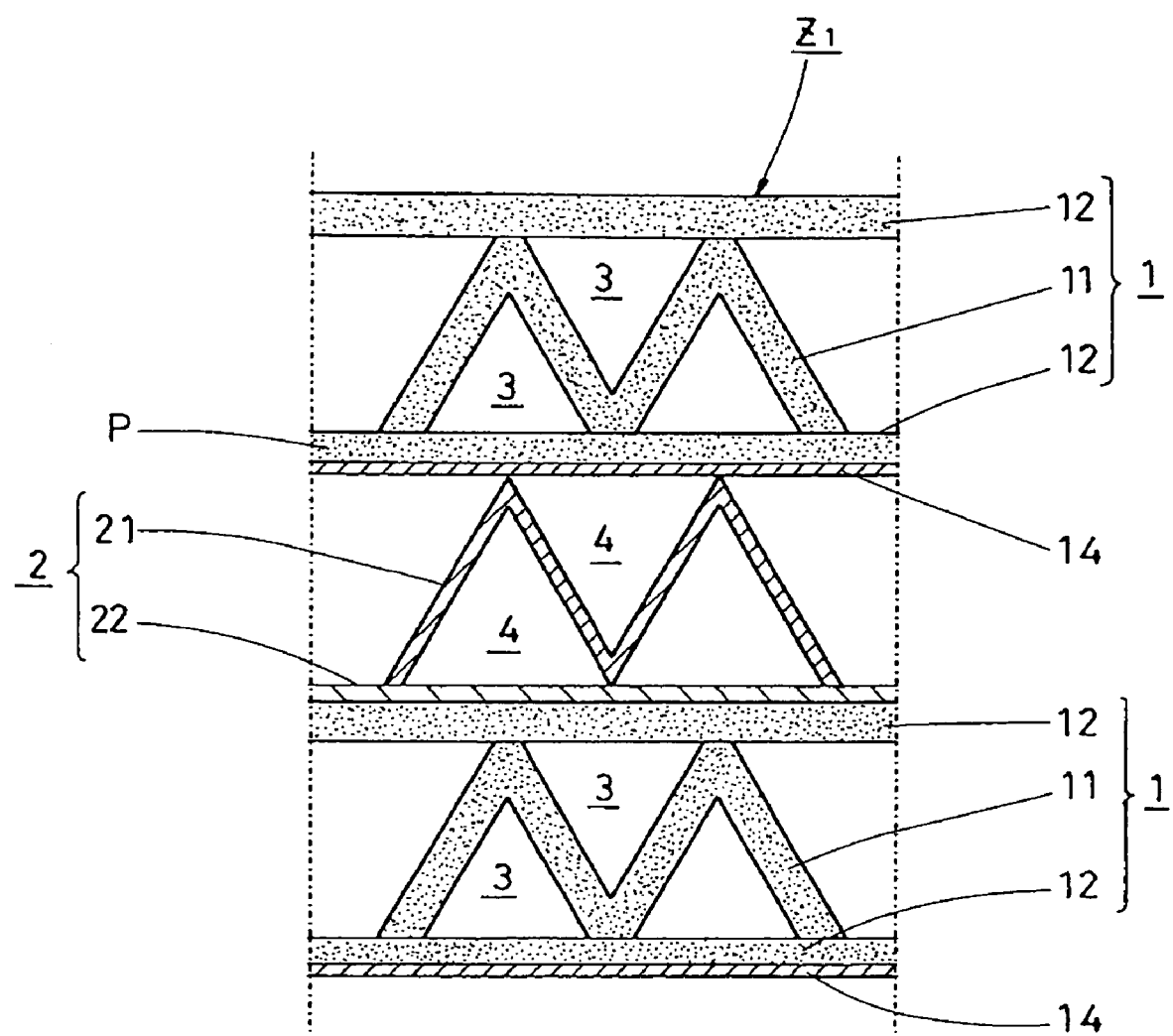
FIG. 2 is a longitudinal sectional view showing in an enlarged manner principal parts of the dehumidification unit shown in FIG. 1.
Figure 3:
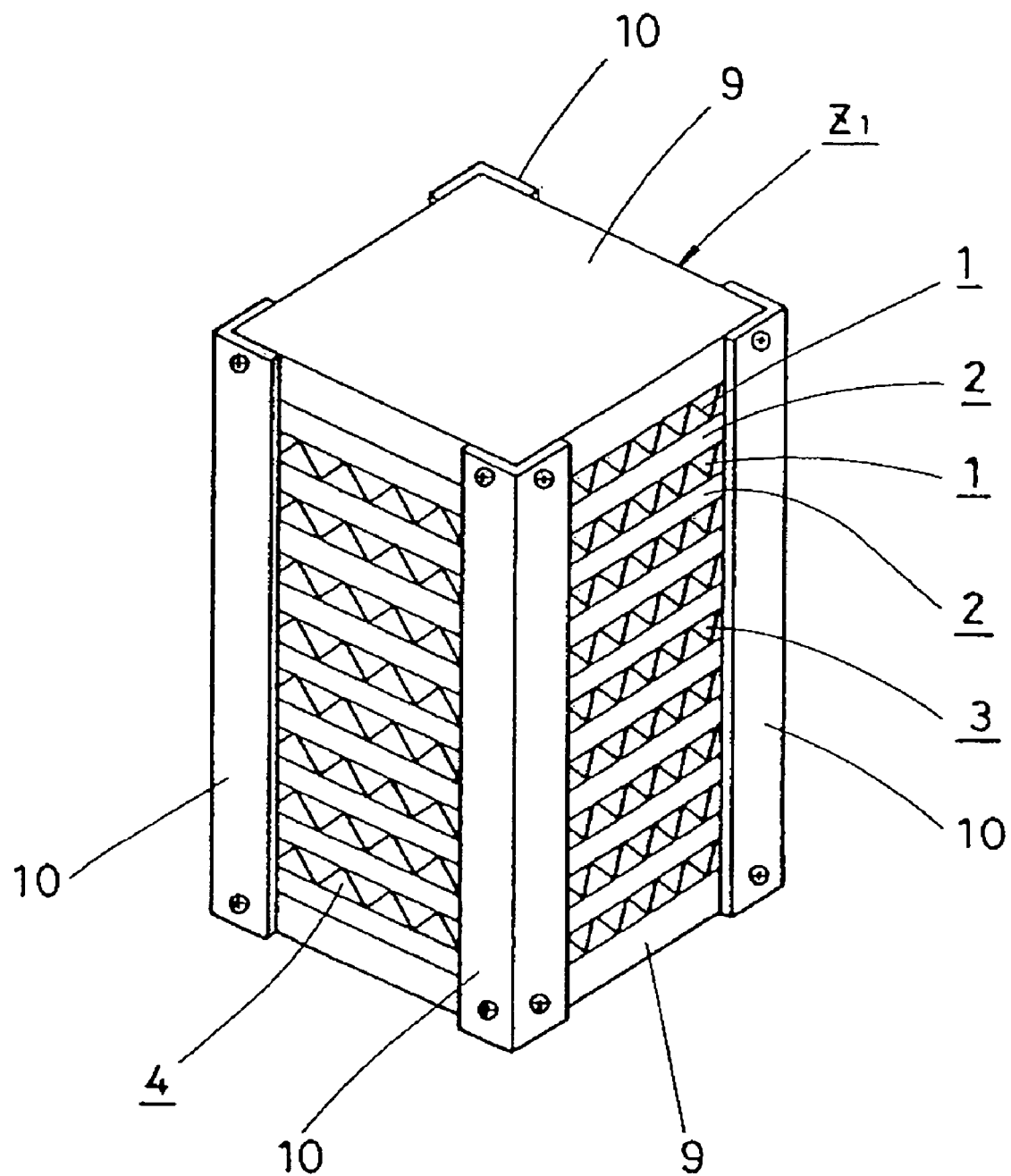
FIG. 3 is an outline perspective view of the dehumidification unit shown in FIG. 1.

Referring to FIGS. 1-3, there is illustrated a dehumidification unit $Z_1$ formed in accordance with a first embodiment of the present invention. As shown in FIG. 1, the dehumidification unit $Z_1$ is formed in the following way. A plurality of adsorption elements 1, 1, ... and a plurality of cooling elements 2, 2, ... are laminated sequentially alternately in a 90-degree plane phase. Then, such a laminated body is provided, at its both ends relative to the lamination direction, with end plates 9, 9, as shown in FIG. 3. Two end plates 9, 9 are connected together by four frame members 10, 10, ... which are arranged along the four corners of the laminated body, whereby these components are combined into a single piece. Hereinafter, specific constructions for the adsorption element 1 and the cooling element 2 will be described.

As shown in FIGS. 1 and 2, the adsorption element 1 is shaped like a double-sided cardboard made up of a belowmentioned air ventilation passage forming member 11 and a pair of side-plate members 12, 12. Note that, for convenience of explanation, the cooling element 2 is deviated 90 degrees in plane phase as if the cooling element 2 and the adsorption element 1 are in the same plane phase, as shown in FIG. 2 (the same is applied to FIGS. 5, 7, 9, 12, and 14).

The air ventilation passage forming member 11 is formed of fiber paper made of ceramic fibers. More specifically, the air ventilation passage forming member 11 is a bending plate member formed by alternately bending a sheet of fiber paper in the thickness direction thereof. The air ventilation passage forming member 11 is shaped, as a whole, like a corrugated plate. Furthermore, each of the pair of the side-plate members 12, 12 is formed of fiber paper made of ceramic fibers, and is shaped into a flat plate. And, the side-plate members 12, 12 are firmly jointed to both surfaces of the air ventilation passage forming member 11, whereby the side-plate members 12, 12 and the air ventilation passage forming member 11 are combined into a single piece. And, as a result of such a combination, a large number of first air ventilation passages 3, 3, ... extending in parallel with each other are formed by "valley" parts of the air ventilation passage forming member 11.

Additionally, a proper adsorbent, such as silica gel etcetera, is supported on the surface of the air ventilation passage forming member 11 and on the surface of each of the pair of the side-plate members 12, 12, thereby to provide them with a required adsorption capability, and a separation sheet layer 14 is formed on an exterior surface of one of the pair of the side-plate members 12, 12. In this way, the adsorption element 1 is constructed.

Here, the separation sheet layer 14 is disposed to prevent the passage of gas and liquid through the side-plate member 12, and to completely separate the first air ventilation passages 3 from second air ventilation passages 4 (described later) on the side of the cooling element 2. For example, the separation sheet layer 14 is formed by attaching a plastic film to the surface of the side-plate member 12, by vapor-depositing a metallic material (for example, aluminum) on the surface of the side-plate member 12, or by applying an organic binder, such as aqueous urethane resin etcetera, onto the surface of the side-plate member 12.

On the other hand, the cooling element 2 is shaped like a single-sided cardboard made up of an air ventilation passage forming member 21 (described later) and a side-plate member 22 (see FIGS. 1 and 2).

Stated another way, the air ventilation passage forming member 21 is made up of a bending plate member formed by alternately bending a sheet metal of aluminum etcetera or a sheet resin in the thickness direction thereof, and is shaped like, as a whole, a corrugated plate. Additionally, the side-plate member 22 is made up of a sheet metal of aluminum etcetera or a sheet resin, and is shaped like a flat plate.

And, the side-plate member 22 is firmly jointed to one surface of the air ventilation passage forming member 21, whereby the side-plate member 22 and the air ventilation passage forming member 21 are combined into a single piece. In this way, the above-described cooling element 2 is obtained. And, as a result of such a combination, a large number of second air ventilation passages 4, 4, . . . extending in parallel with each other are formed by "valley" parts of the air ventilation passage forming member 21.

The adsorption element 1 and the cooling element 2, which are constructed as mentioned above, are arranged such that the side-plate member 12 of the adsorption element 1 provided with the separation sheet layer 14 is positioned face to face with "mountain" parts of the air ventilation passage forming member 21 of the cooling element 2, and are laminated sequentially alternately in a 90-degree plane phase relative to each other. These elements as a laminated body are firmly joined together by the end plates 9, 9 and the frame members 10, 10, . . . , thereby to provide the dehumidification unit $Z_1$ having a rectangular block-like outer appearance (see FIG. 3).

In this dehumidification unit $Z_1$, humid air as the to-be-processed air (Aa) is passed through the first air ventilation passages 3, 3, . . . of each adsorption element 1 and, on the other hand, the cooling air (Ab) is passed through the second air ventilation passages 4, 4, . . . of each cooling element 2. Thereby, the moisture contained in the to-be-processed air (Aa) is adsorption-removed by the adsorbent supported on the adsorption element 1, and heat of adsorption resulting from such moisture adsorption exchanges heat with the cooling air (Ab) and is liberated towards the cooling air (Ab). As a result, the adsorption capability of the adsorbent is maintained at satisfactory levels over a long period of time, and the dehumidification unit $Z_1$ demonstrates high dehumidification performance.

And now, in the dehumidification unit $Z_1$ of the present embodiment, the inventions as set forth in claim 1, claim 2, claim 5, and claim 8 of the present application are applied to the construction of the adsorption element 1 and to the construction of the cooling element 2, thereby securing dehumidification performance of higher level.

That is, in the dehumidification unit $Z_1$ of the present embodiment, as shown in FIG. 2, on the side of one of the side-plate members 12, 12 of the adsorption element 1 provided with the separation sheet layer 14, the first air ventilation passages 3, 3, . . . of the adsorption element 1 and the second air ventilation passages 4, 4, . . . of the cooling element 2 are adjacently formed, with only the one side-plate member 12 lying therebetween and, in addition, the first air ventilation passages 3, 3, . . . are completely separated from the second air ventilation passages 4, 4, . . . by the separation sheet layer 14. Accordingly, on the side of the one side-plate member 12, only the one side-plate member 12 exists as resistance against heat transfer between the first air ventilation passages 3 on the side of the adsorption element 1 and the second air ventilation passages 4 on the side of the cooling element 2.

On the other hand, the other side-plate member 12 of the adsorption element 1 is attached to the side-plate member 22 of the cooling element 2. Therefore, on the side of the other side-plate member 12, two plate members, i.e., the other side-plate member 12 and the side-plate member 22 of the cooling element 2, exist as resistance against heat transfer.

The side of the one side-plate member 12 of the adsorption element 1 is compared with the side of the other side-plate member 12 of the adsorption element 1. On the side of the one side-plate member 12, there is less heat transfer resistance than on the side of the other side-plate member 12, and the efficiency of liberation of the heat of adsorption increases correspondingly and dehumidification performance is also maintained at satisfactory levels.

Figure 19:
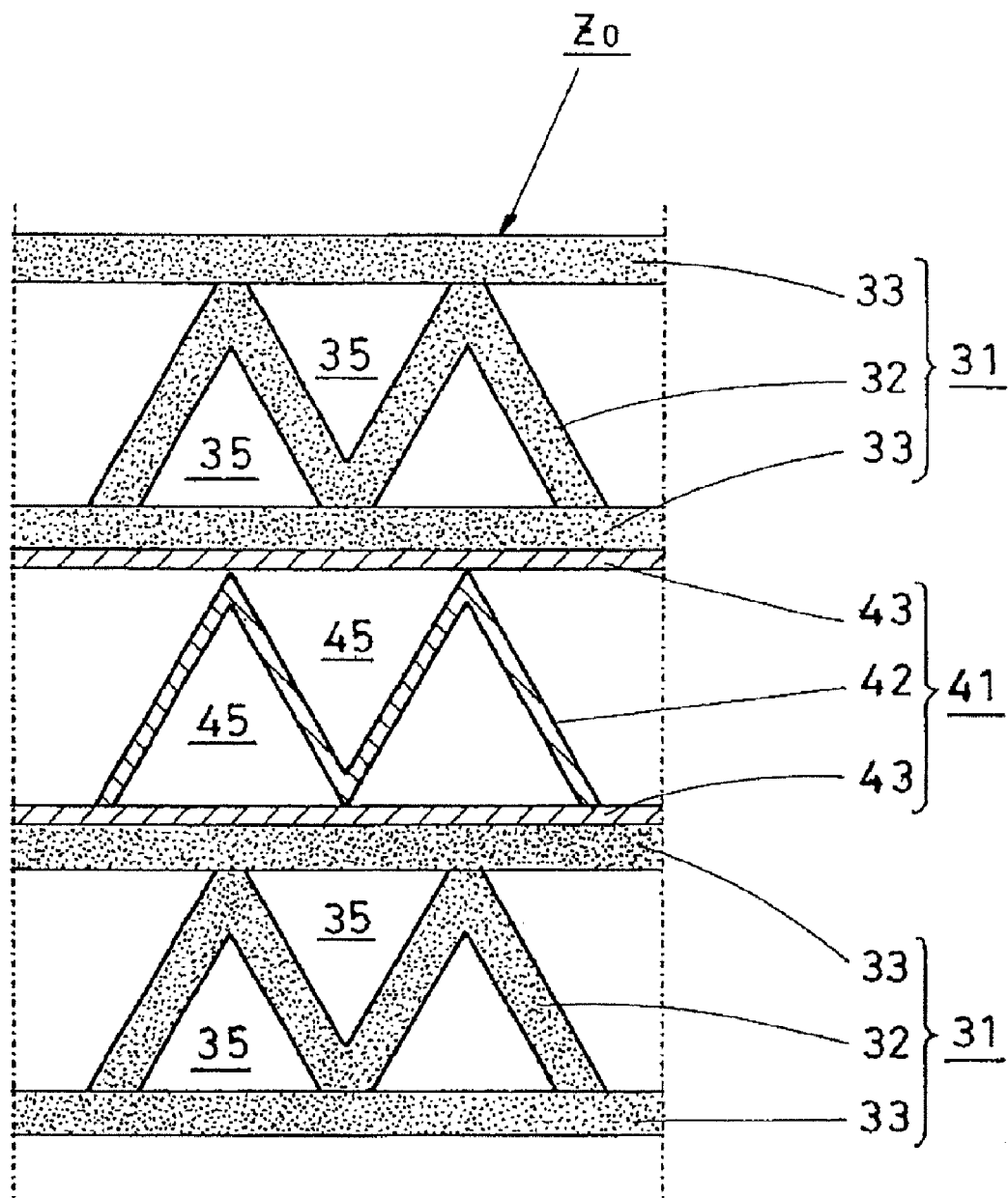
FIG. 19 is a perspective view showing in an exploded manner principal parts of a conventional dehumidification unit.
Figure 20:
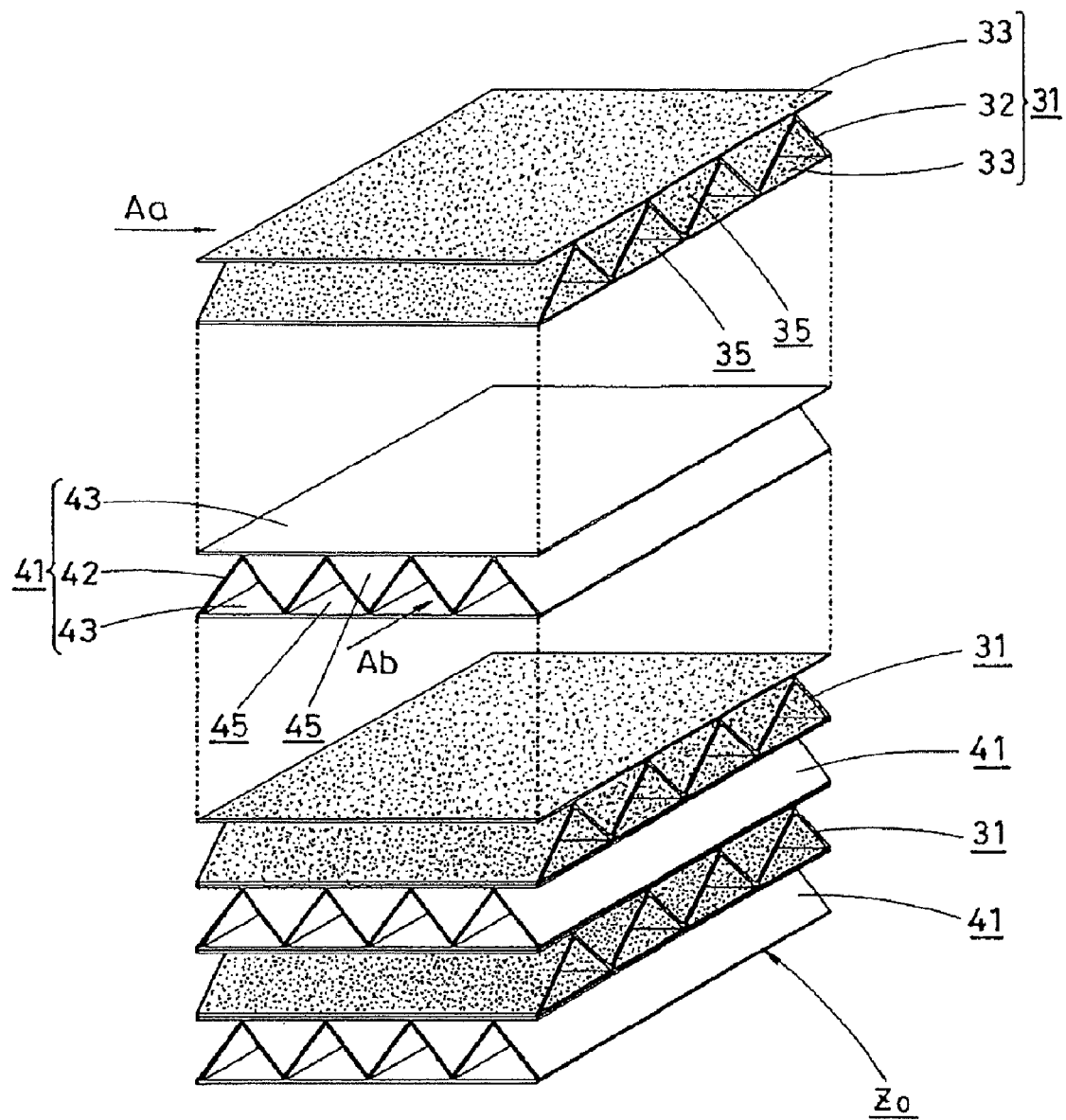
FIG. 20 is a longitudinal sectional view showing in an enlarged manner principal parts of the dehumidification unit shown in FIG. 19.

Therefore, for example, when compared with the case where two plate members exist as resistance against heat transfer both on the side of the one side-plate member 12 and on the side of the other side-plate member 12 (see the conventional dehumidification unit $Z_0$ shown in FIG. 19), the dehumidification unit $Z_1$ of the present embodiment has, as a whole, higher heat transfer performance and, as a result, the dehumidification performance of the dehumidification unit $Z_1$ will be maintained at satisfactory levels over a long period of time.

Additionally, in the dehumidification unit $Z_1$ of the present embodiment, it is arranged such that, on the side of the one side-plate member 12 of the adsorption element 1, only the one side-plate member 12 is interposed between the first and second air ventilation passages 3, 4 which are adjacently formed in the lamination direction. Consequently, when compared with the construction in which, also on the side of the one side-plate member 12, two plate members (i.e., the other side-plate member 12 and the side-plate member 22 of the cooling element 2) are interposed between the first and second air ventilation passages 3, 4 (like on the side of the other side-plate member 12), the dimension of the dehumidification unit $Z_1$ relative to the height direction thereof is reduced by an amount corresponding to reduction in the number of plate members to be interposed between the first and second air ventilation passages 3, 4. In addition, costs are cut because the number of component members is reduced.

In the present embodiment, one of the pair of the side-plate members 12, 12 of the adsorption element 1 that is provided with the separation sheet layer 14 corresponds to the "plate member P".

II. Embodiment 2

Figure 4:
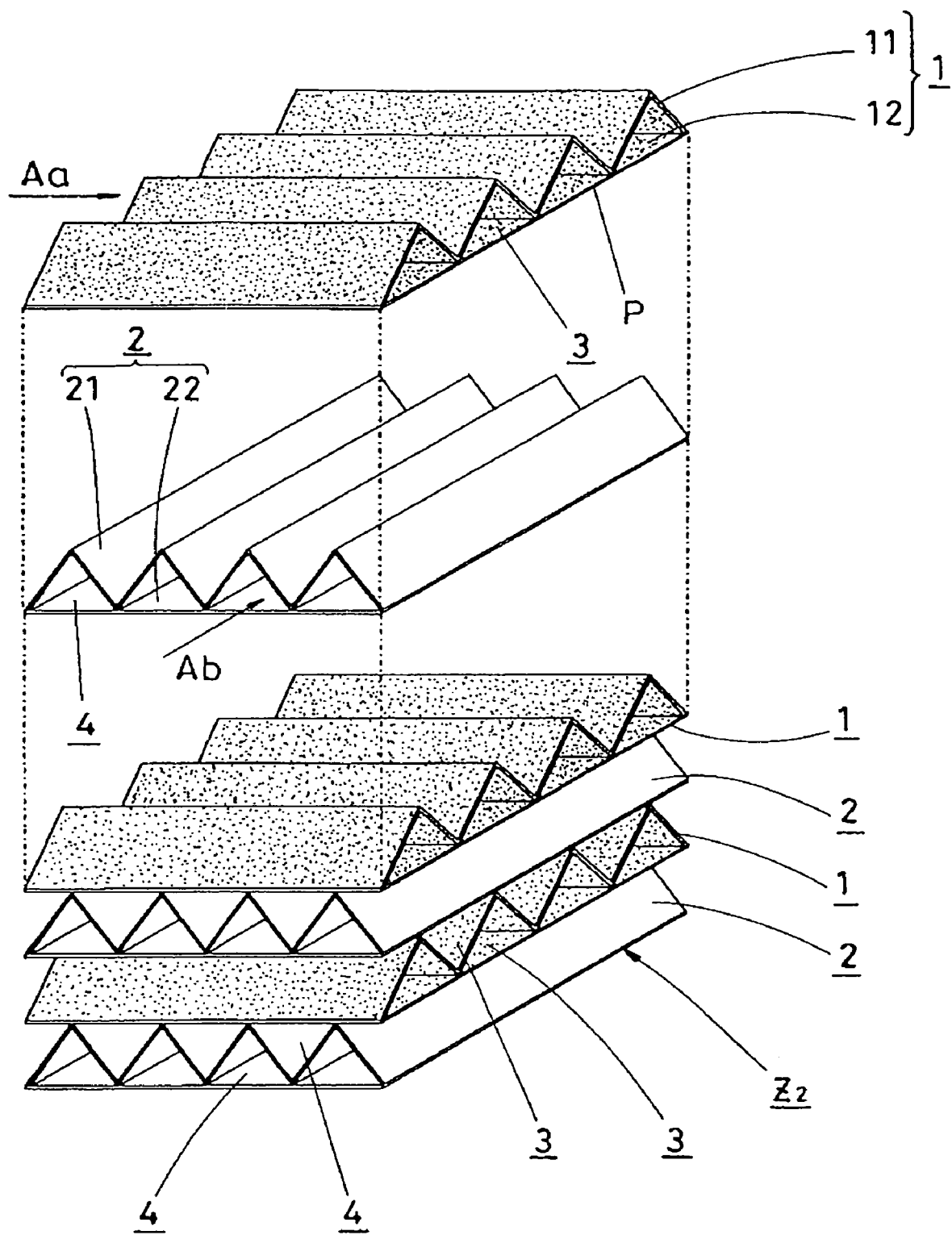
FIG. 4 is a perspective view showing in an exploded manner principal parts of a dehumidification unit according to a second embodiment of the present invention.
Figure 5:
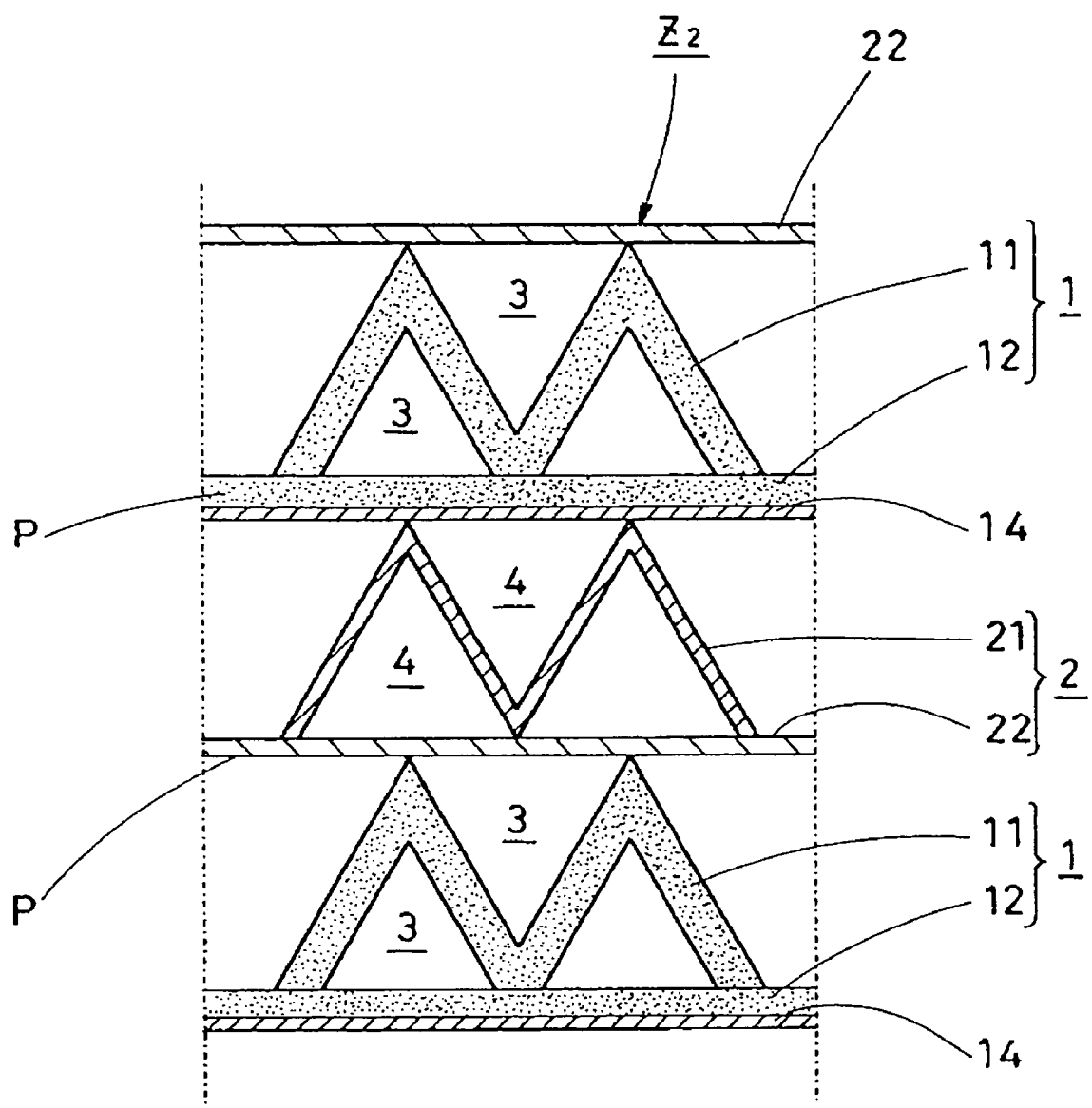
FIG. 5 is a longitudinal sectional view showing in an enlarged manner principal parts of the dehumidification unit shown in FIG. 4.

Referring to FIGS. 4 and 5, there is illustrated a dehumidification unite $Z_2$ formed in accordance with a second embodiment of the present invention. As can be seen from FIG. 4, the dehumidification unit $Z_2$ is formed by sequentially alternately laminating a plurality of adsorption elements 1, 1, . . . and a plurality of cooling elements 2, 2, . . . one upon the other in a 90-degree plane phase. The dehumidification unit $Z_2$ of the present embodiment is identical in basic construction with the dehumidification unit $Z_1$ of the first embodiment, with the exception that the adsorption element 1 of the dehumidification unit $Z_2$ differs in construction from the adsorption element 1 of the dehumidification unit $Z_1$.

To sum up, in the adsorption element 1 of the dehumidification unit $Z_1$ according to the first embodiment, the side-plate member 12 is provided on both sides of the air ventilation passage forming member 11. On the other hand, in the dehumidification unit $Z_2$ of the present embodiment, the side-plate member 12 is provided on only one side of the air ventilation passage forming member 11 and the separation sheet layer 14 is provided on an exterior surface of the side-plate member 12. In other words, the adsorption element 1 of the dehumidification unit $Z_2$ according to the present embodiment has a construction as a result of removing the other side-plate member 12 from the adsorption element 1 of the dehumidification unit $Z_1$ according to the first embodiment.

And, when employing the adsorption element 1 thus constructed and forming the dehumidification unit $Z_2$ by alternate laminations of the adsorption element 1 and the cooling element 2, the air ventilation passages 3, 3, . . . of each adsorption element 1 and the second air ventilation passages 4, 4, . . . of each cooling element 2 are adjacently formed with only the side-plate member 12 of the adsorption element 1 lying therebetween on the side of one surface of the cooling element 2, while on the other hand they are adjacently formed with only the side-plate member 22 of the cooling element 2 lying therebetween on the side of the other surface (see FIG. 5). The performance of heat transfer between the first air ventilation passage 3 and the second air ventilation passage 4 is improved in all the contact areas between the adsorption element 1 and the cooling element 2, as a result of which the dehumidification unit $Z_2$ is improved further in dehumidification capability.

Moreover, with the dehumidification unit $Z_2$ of the present embodiment, the side-plate member 12 is provided only on one side of the adsorption element 1. Therefore, when compared to, for example, the foregoing construction in which the side-plate member 12 is provided on each side of the adsorption element 1 of the dehumidification unit $Z_1$ of the first embodiment, the dehumidification unit $Z_2$ is made further compact in size relative to its height direction by an amount corresponding to reduction in the number of the side-plate members 12.

In addition, since the present embodiment is identical in configuration and operation/working effects of the remaining components other than the above with the first embodiment, their description is omitted here by using the explanation made in the first embodiment.

Additionally, in the present embodiment the side-plate member 12 of the absorption element 1 and the side-plate member 22 of the cooling element 2 each correspond to the "plate member P".

III. Embodiment 3

Figure 6:
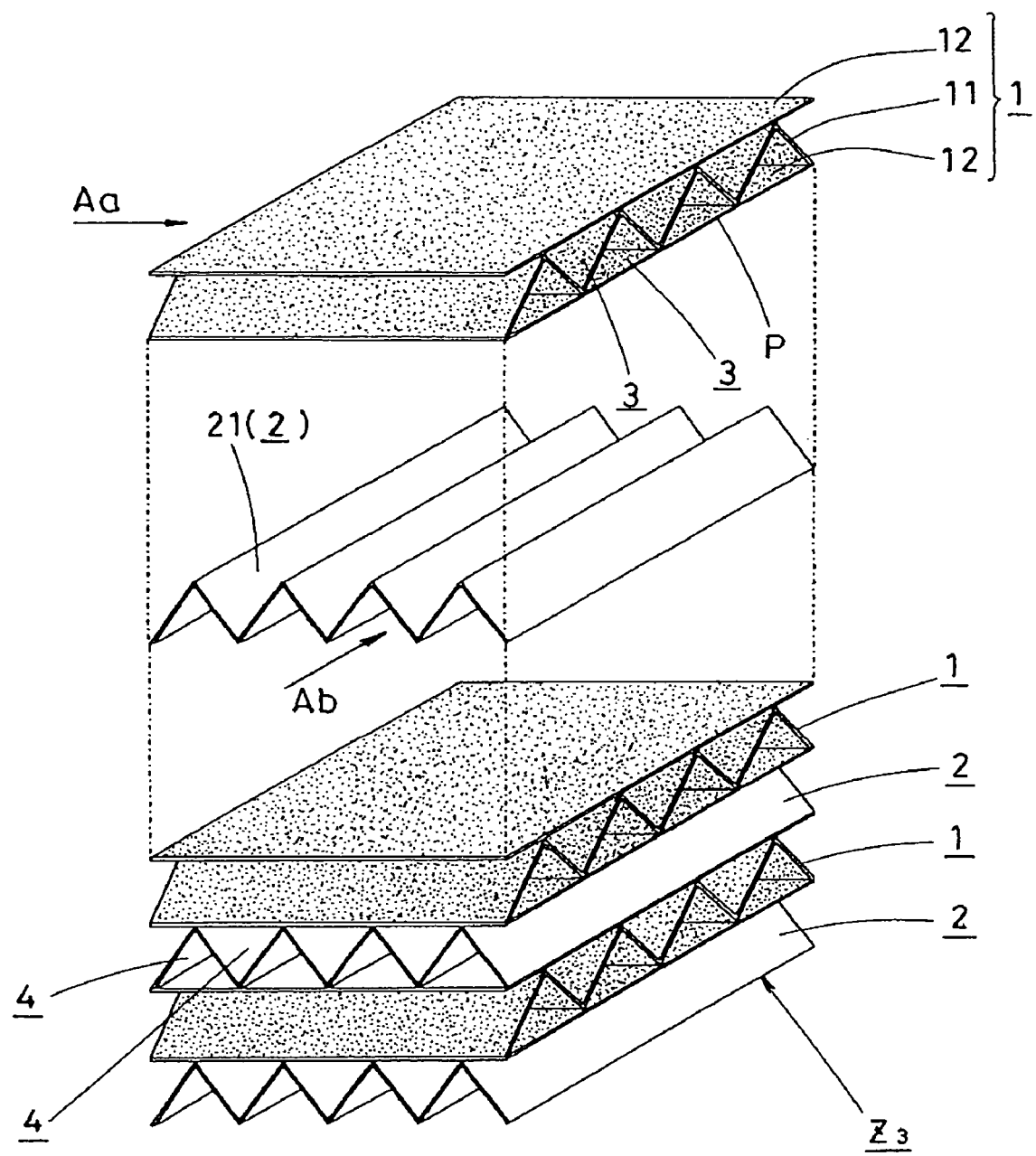
FIG. 6 is a perspective view showing in an exploded manner principal parts of a dehumidification unit according to a third embodiment of the present invention.
Figure 7:
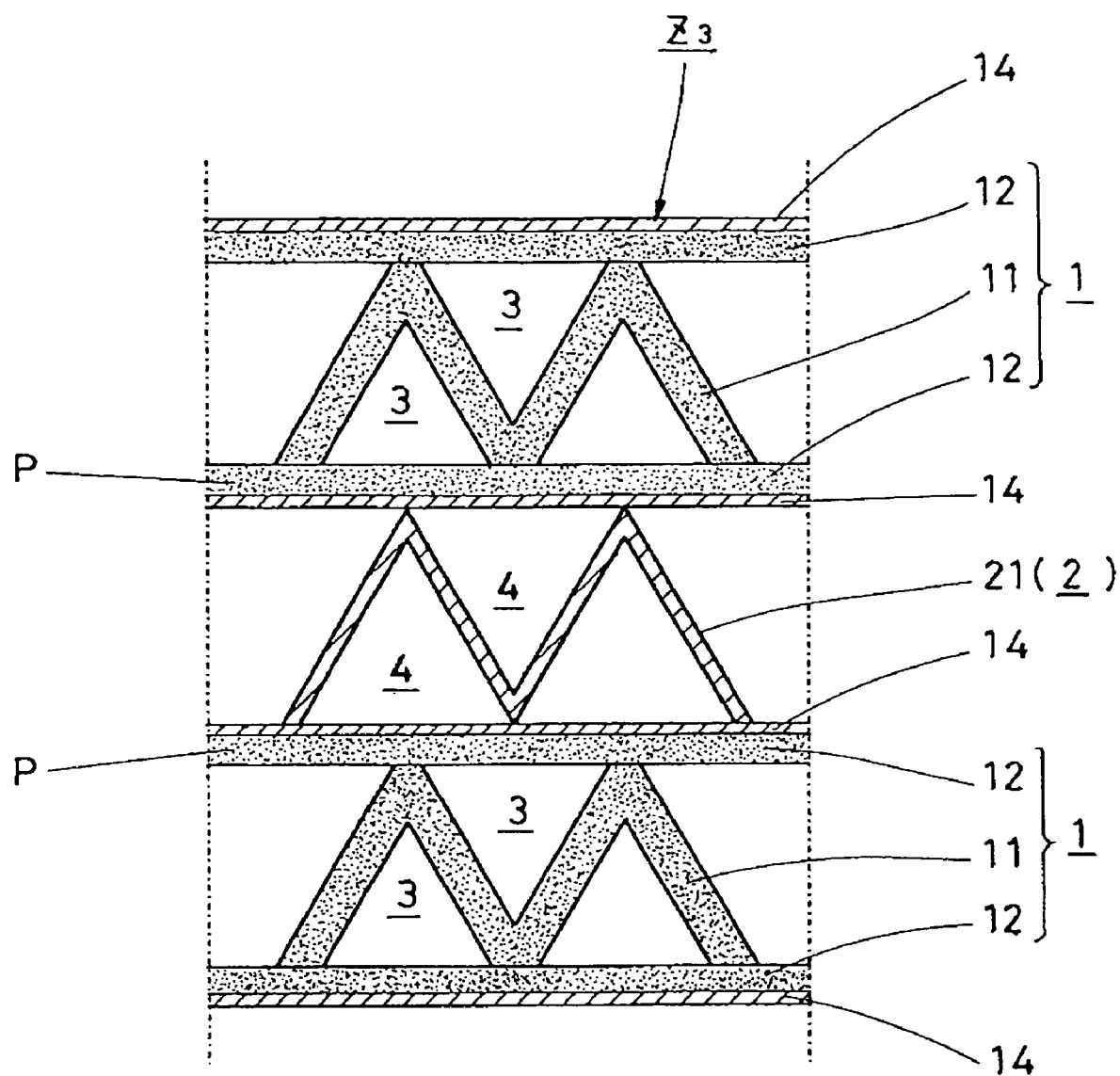
FIG. 7 is a longitudinal sectional view showing in an enlarged manner principal parts of the dehumidification unit shown in FIG. 6.

Referring to FIGS. 6 and 7, there is illustrated a dehumidification unit $Z_3$ formed in accordance with a third embodiment of the present invention. As shown in FIG. 6, the dehumidification unit $Z_3$ is formed by sequentially alternately laminating a plurality of adsorption elements 1, 1, . . . and a plurality of cooling elements 2, 2, . . . one upon the other in a 90-degree plane phase. The dehumidification unit $Z_3$ of the present embodiment is identical in basic construction with the dehumidification unit $Z_1$ of the first embodiment, with the exception that they differ from each other in construction of the adsorption element 1 as well as in construction of the cooling element 2.

The adsorption element's construction difference is pointed out. For the case of the adsorption element 1 of the dehumidification unit $Z_1$ according to the first embodiment, each side of the air ventilation passage forming member 11 is provided with the side-plate member 12 and the separation sheet layer 14 is formed only on the surface of one of the pair of the side-plate members 12. Unlike the first embodiment, for the case of the adsorption element 1 of the present embodiment, each of the pair of the side-plate members 12 respectively mounted on both sides of the adsorption element 1 has, on its surface, the separation sheet layer 14. Next, the cooling element's construction difference is pointed out. The cooling element 2 of the first embodiment is made up of the air ventilation passage forming member 21 and the side-plate member 22. On the other hand, the cooling element 2 of the present invention is made up only of the air ventilation passage forming member 21.

When employing the adsorption and cooling elements 1, 2 thus constructed and forming the dehumidification unit $Z_3$ by alternately laminating them one upon the other, the air ventilation passages 3, 3, . . . of each adsorption element 1 and the second air ventilation passages 4, 4, . . . of each cooling element 2 are adjacently formed with only the side-plate member 12 of the adsorption element 1 lying therebetween in all the contact areas between the adsorption element 1 and the cooling element 2. As a result, the performance of heat transfer between the first air ventilation passage 3 and the second air ventilation passage 4 is improved further in comparison with the first embodiment, and the dehumidification unit $Z_3$ is improved further in dehumidification capability.

Additionally, in the dehumidification unit $Z_3$ of the present embodiment, the cooling element 2 is made up only of the air ventilation passage forming member 21. Therefore, when compared with the case where the cooling element 2 is made up of two different members, e.g., the air ventilation passage forming member 21 and the side-plate member 22 (see the cooling element 2 of the first embodiment), the dehumidification unit $Z_3$ is formed by a less number of component members, and cost savings are promoted by an amount corresponding to reduction in the number of component members.

In addition, since the present embodiment is identical in construction and operation/working effects of the remaining components other than the above with the first embodiment, their description is omitted here by using the explanation made in the first embodiment.

Additionally, in the present embodiment, each of the pair of the side-plate members 12, 12 of the adsorption element 1 corresponds to the "plate member P".

IV. Embodiment 4

Figure 8:
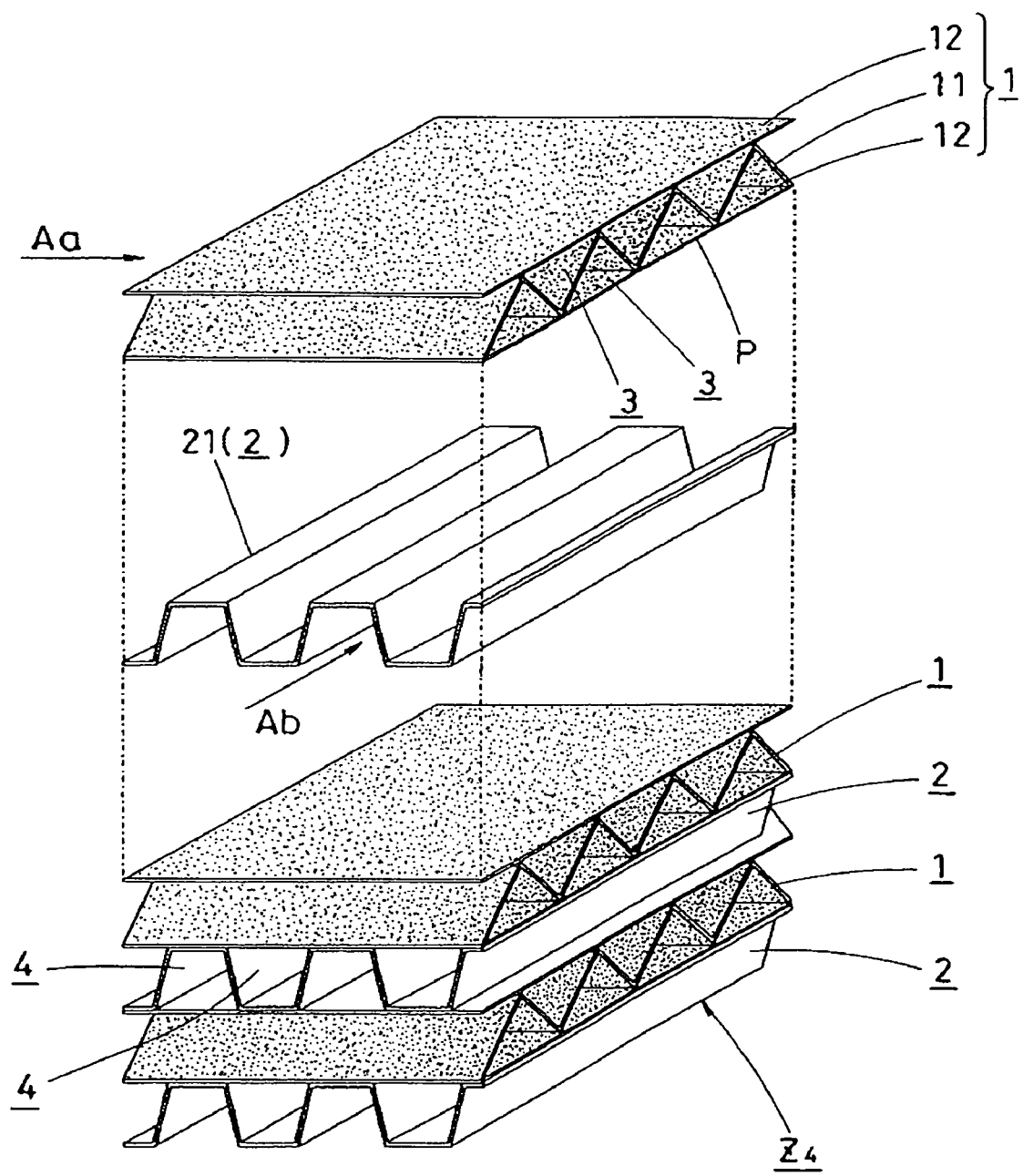
FIG. 8 is a perspective view showing in an exploded manner principal parts of a dehumidification unit according to a fourth embodiment of the present invention.
Figure 9:
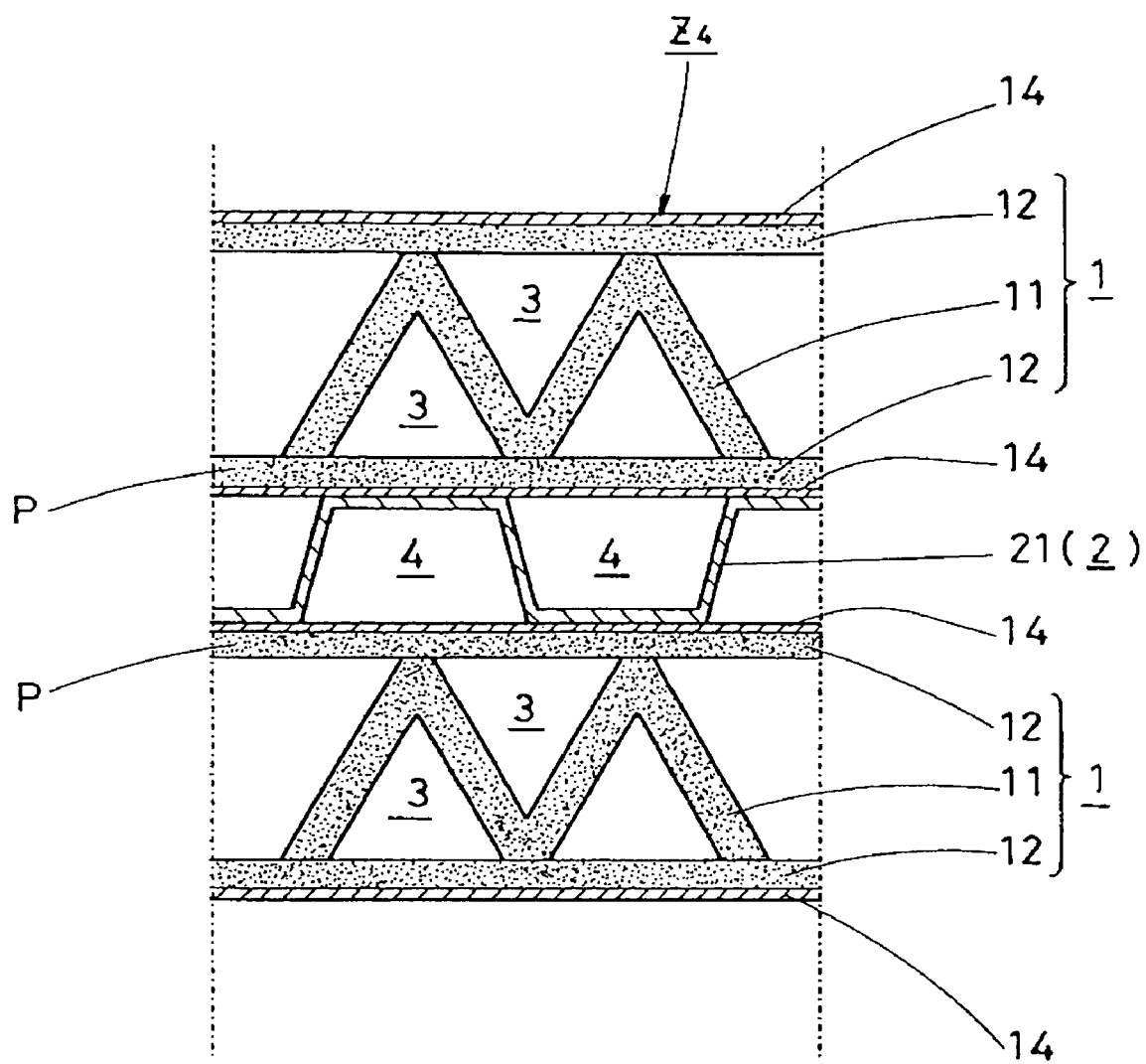
FIG. 9 is a longitudinal sectional view showing in an enlarged manner principal parts of the dehumidification unit shown in FIG. 8.
Figure 10:
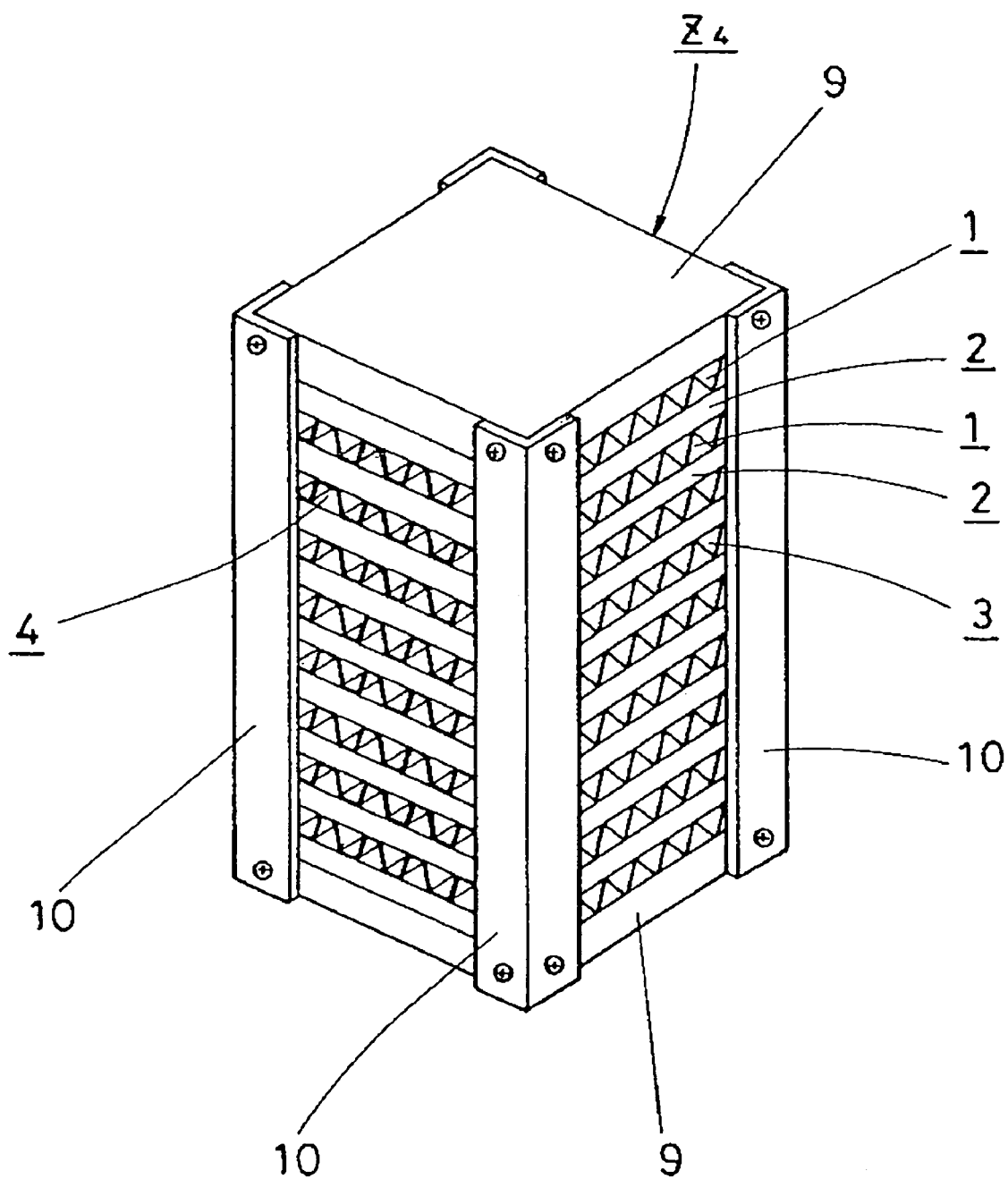
FIG. 10 is an outline perspective view of the dehumidification unit shown in FIG. 8.

Referring to FIGS. 8-10, there is illustrated a dehumidification unit $Z_4$ formed in accordance with a fourth embodiment of the present invention. As shown in FIG. 8, the dehumidification unit $Z_4$ is formed by sequentially alternately laminating a plurality of adsorption elements 1, 1, . . . and a plurality of cooling elements 2, 2, . . . one upon the other in a 90-degree plane phase. The dehumidification unit $Z_4$ of the present embodiment is identical in basic construction with the dehumidification unit $Z_3$ of the third embodiment, with the exception that they differ from each other in the cooling element's 2 construction.

The cooling element 2 of the dehumidification unit $Z_3$ according to the third embodiment is made up only of the air ventilation passage forming member 21 in the form of a corrugated bending plate member. On the other hand, the cooling element 2 of the dehumidification unit $Z_4$ according to the present embodiment is made up only of a trapezoidally corrugated bending plate member. Accordingly, the dehumidification unit $Z_4$ differs from the dehumidification unit $Z_3$ in bending form of the air ventilation passage forming member 21 and in cross-sectional shape of the second air ventilation passage 4 formed by the air ventilation passage forming member 21.

When employing the cooling element 2 thus constructed and forming the dehumidification unit $Z_4$ by alternate laminations of the cooling element 2 and the adsorption element 1, first air ventilation passages 3 of the adsorption element 1 corresponding to the bottom of the air ventilation passage forming member 21 and their associated second air ventilation passages 4 on the side of the cooling element 2 are adjacently formed with two different plate members (i.e., the bottom of the air ventilation passage forming member 21 and the side-plate member 12 of the adsorption element 1) lying therebetween and, on the other hand, the remaining first air ventilation passages 3 corresponding to the opening of the air ventilation passage forming member 21 and their associated second air ventilation passages 4 are adjacently formed with only a single plate member (i.e., the side-plate member 12 of the adsorption element 1) lying therebetween, as shown in FIG. 9. Therefore, the latter one is higher in the performance of heat transfer between the first air ventilation passage 3 and the second air ventilation passage 4 than the former one.

Therefore, the total heat transfer performance of the dehumidification unit $Z_4$ is higher when compared, for example, with the structure of a conventional dehumidification unit (see FIG. 17) in which all the first air ventilation passages 3 on the side of the adsorption element 1 and all the second air ventilation passages 4 on the side of the cooling element 2 are adjacently formed, with two sheets of plates lying therebetween. As a result of such arrangement, the dehumidification unit $Z_4$ will provide higher-level dehumidification performance.

Moreover, in the dehumidification unit $Z_4$ of the present embodiment, the second air ventilation passage 4 of the cooling element 2 has a trapezoidal cross section, because of which the effective sectional area of the second air ventilation passage 4 is large, as compared, for example, with the second air ventilation passage 4 having a triangular cross section as in the cooling element 2 of the dehumidification unit $Z_1$ according to the first embodiment. The rate of flow of the cooling air (Ab) increases correspondingly, and the action of liberation of heat of adsorption is promoted further. As a result, the dehumidification performance of the dehumidification unit $Z_4$ will be improved to a further extent.

In addition, since the present embodiment is identical in configuration and operation/working effects of the remaining components other than the above with the first and third embodiments, their description is omitted here by using the explanation made in the first and third embodiments.

Additionally, in the present embodiment, each of the pair of the side-plate members 12, 12 of the adsorption element 1 corresponds to the "plate member P" as set forth in the claims.

V. Embodiment 5

Figure 11:
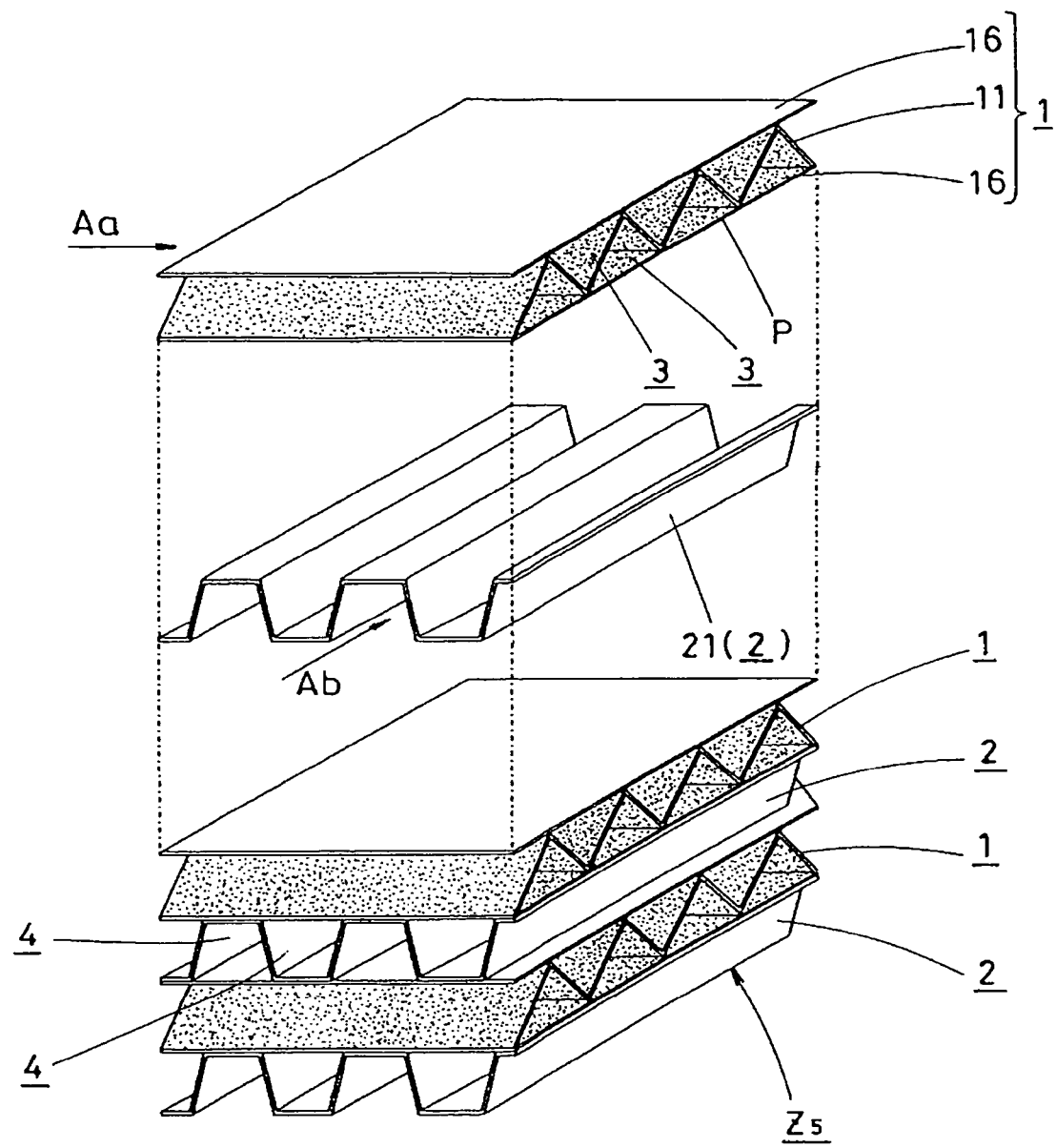
FIG. 11 is a perspective view showing in an exploded manner principal parts of a dehumidification unit according to a fifth embodiment of the present invention.
Figure 12:
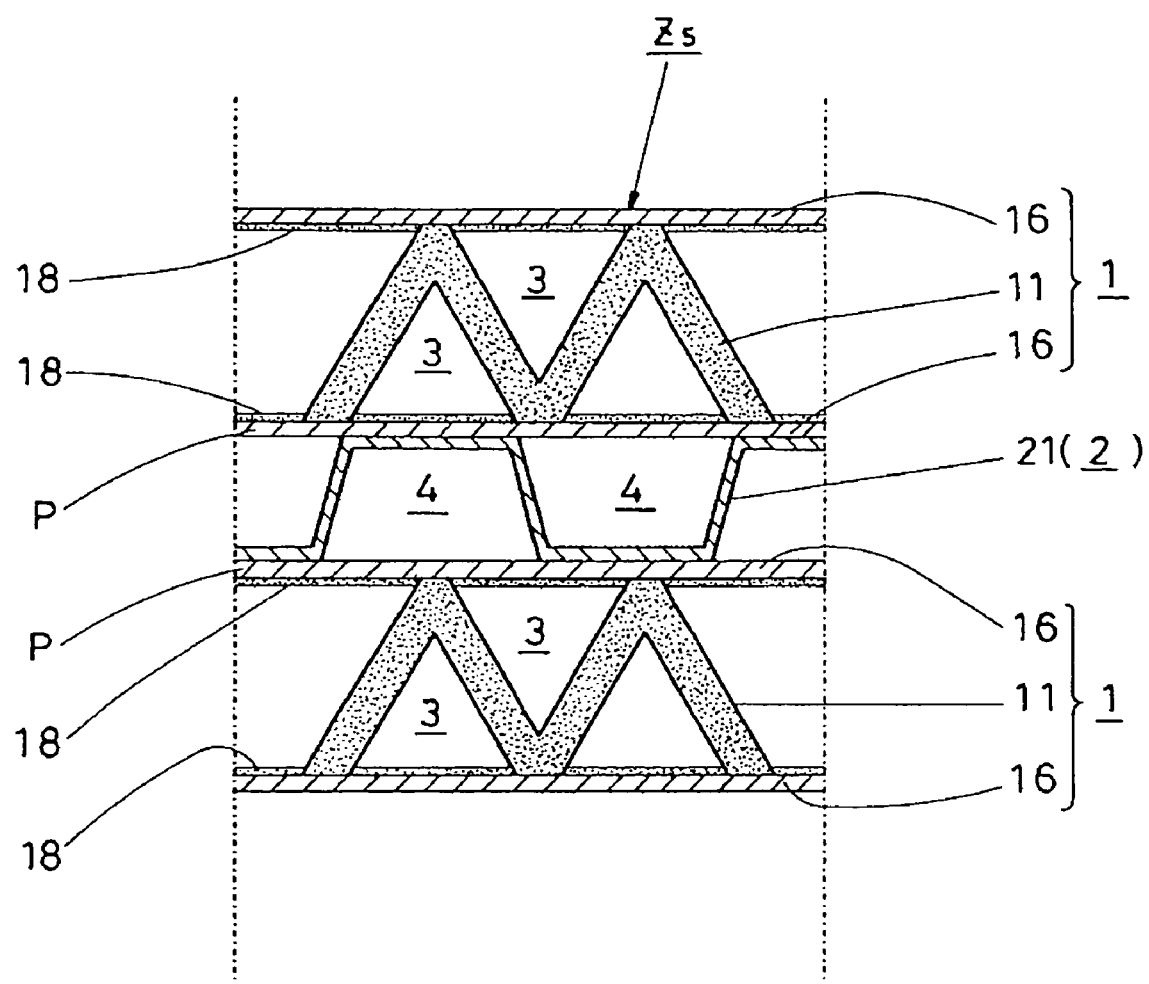
FIG. 12 is a longitudinal sectional view showing in an enlarged manner principal parts of the dehumidification unit shown in FIG. 11.

Referring to FIGS. 11 and 12, there is illustrated a dehumidification unit $Z_5$ formed in accordance with a fifth embodiment of the present invention. The dehumidification unit $Z_5$ is the result of the application of inventions as set forth in claim 1, claim 4, and claim 6. As shown in FIG. 11, the dehumidification unit $Z_5$ is formed by sequentially alternately laminating a plurality of adsorption elements 1, 1, . . . and a plurality of cooling elements 2, 2, . . . one upon the other in a 90-degree plane phase. The dehumidification unit $Z_5$ of the present embodiment is similar in basic configuration to the dehumidification unit $Z_4$ of the fourth embodiment, with the exception that they differ from each other in the adsorption element's 1 configuration.

More specifically, the adsorption element 1 of the fourth embodiment is made up of the air ventilation passage forming member 11 in the form of a corrugated plate and the pair of the side-plate members 12, 12 all of which are made of fiber paper. On the other hand, the adsorption element 1 of the present embodiment is made up of the air ventilation passage forming member 11 in the form of a corrugated plate made of fiber paper and a pair of side-plate members 12, 12 each formed by a sheet metal of aluminum etcetera or by a sheet resin and, in addition, a surface of each of the pair of the side-plate members 12, 12 facing the air ventilation passage forming member 11 supports thereon an absorbent to form an absorbent layer 18.

In addition, like the cooling element 2 of the fourth embodiment, the cooling element 2 of the present embodiment is made up of a bending plate shaped like a trapezoidally corrugated bending plate which is formed by a sheet metal of aluminum etcetera or by a sheet resin.

When employing the adsorption element 1 of such configuration and forming the dehumidification unit $Z_5$ by alternate laminations of the adsorption element 1 and the cooling elements 2, first air ventilation passages 3 of the adsorption element 1 corresponding to the bottom of the air ventilation passage forming member 21 and their associated second air ventilation passages 4 on the side of the cooling element 2 are adjacently formed, with two different plate members (i.e., the bottom of the air ventilation passage forming member 21 and the side-plate member 12 of the adsorption element 1) lying therebetween and, on the other hand, the remaining first air ventilation passages 3 corresponding to the opening of the air ventilation passage forming member 21 and their associated second air ventilation passages 4 are adjacently formed, with only a single plate member (i.e., the side-plate member 12) lying therebetween, as shown in FIG. 12. Therefore, the latter one is higher in the performance of heat transfer between the first air ventilation passage 3 and the second air ventilation passage 4 than the former one.

Consequently, the total heat transfer performance of the dehumidification unit $Z_5$ is higher when compared, for example, with the structure of a conventional dehumidification unit (see FIG. 19) in which all the first air ventilation passages 3 on the side of the adsorption element 1 and all the second air ventilation passages 4 on the side of the cooling element 2 are adjacently formed, with two sheets of plates lying therebetween.

Moreover, when the side-plate member 16 is formed by a sheet metal of aluminum etcetera, the transfer of heat between the air ventilation passage 3 and the air ventilation passage 4 is promoted further, when compared with the case in which the side-plate member 16 is formed of fiber paper as in the fourth embodiment, because in the former case such a metal material has a higher heat transfer rate. In addition, because of the arrangement that adsorbent is supported directly on the side-plate member 16 of high heat transfer rate, the efficiency of liberation of heat of adsorption generated in the absorbent towards the cooling air (Ab) is also improved.

As a synergistic effect of the above advantages, the dehumidification unit $Z_5$ will have still higher level dehumidification capability.

In addition, since the present embodiment is identical in configuration and operation/working effects of the remaining components other than the above with the first and fourth embodiments, their description is omitted here by using the explanation made in the first and fourth embodiments.

Additionally, in the present embodiment, each of the pair of the side-plate members 16, 16 of the adsorption element 1 corresponds to the "plate member P".

VI. Embodiment 6

Figure 13:
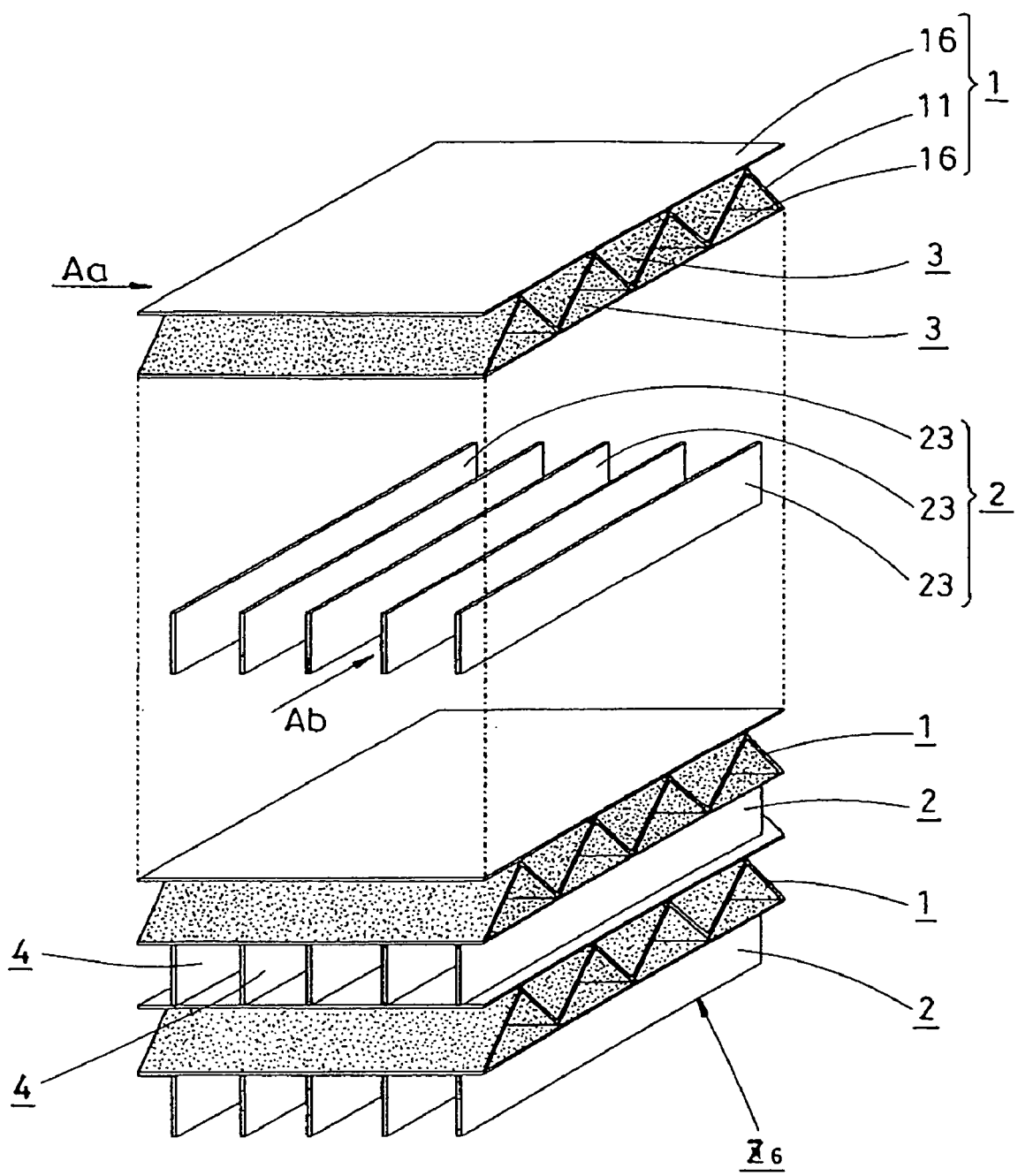
FIG. 13 is a perspective view showing in an exploded manner principal parts of a dehumidification unit according to a sixth embodiment of the present invention.
Figure 14:
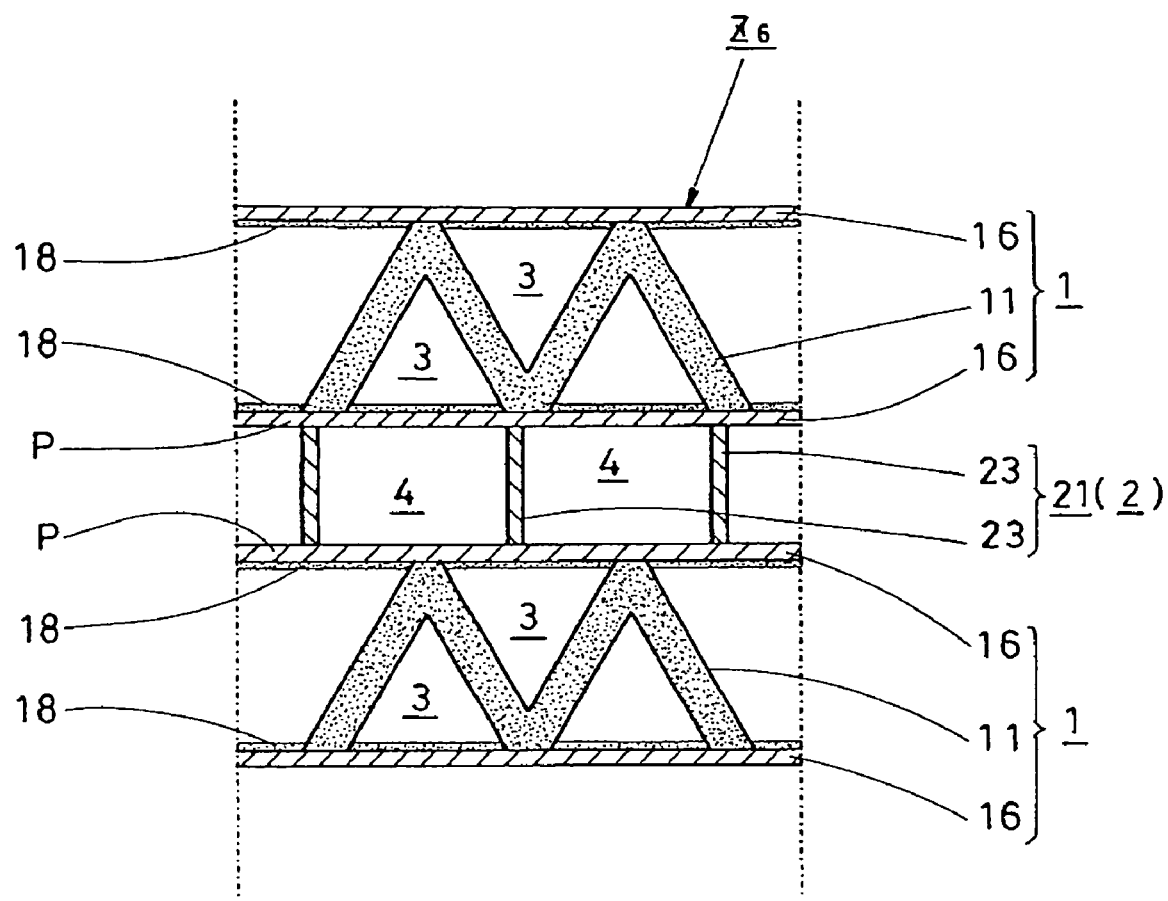
FIG. 14 is a longitudinal sectional view showing in an enlarged manner principal parts of the dehumidification unit shown in FIG. 13.
Figure 15:
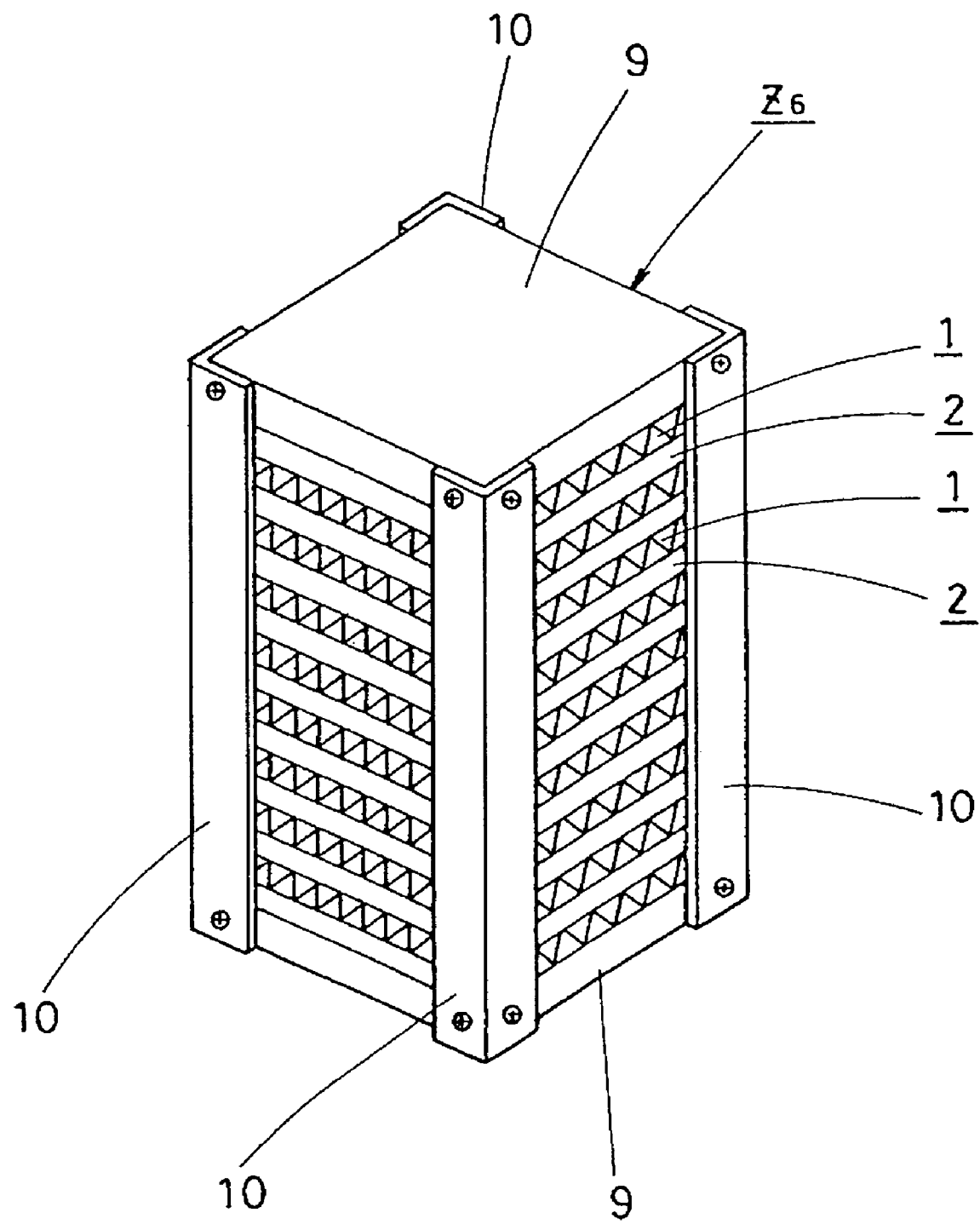
FIG. 15 is an outline perspective view of the dehumidification unit shown in FIG. 13.

Referring to FIGS. 13-15, there is illustrated a dehumidification unit $Z_6$ formed in accordance with a sixth embodiment of the present invention. As shown in FIG. 13, the dehumidification unit $Z_6$ is formed by sequentially alternately laminating a plurality of adsorption elements 1, 1, ... and a plurality of cooling elements 2, 2, ... one upon the other in a 90-degree plane phase, and by firmly joining together the elements thus laminated by the upper and lower end plates 9, 9 and the four frame members 10, 10, . . . . The dehumidification unit $Z_6$ of the present embodiment is similar in basic configuration to the dehumidification unit $Z_5$ of the fifth embodiment, with the exception that they differ from each other in the cooling element's 2 configuration.

In the fifth embodiment, the cooling element 2 is formed by a bending plate member, more specifically a sheet metal of aluminum etcetera or a sheet resin shaped like a trapezoidally corrugated plate. On the other hand, the cooling element 2 of the present embodiment is made up only of the air ventilation passage forming member 21 formed by arranging, in a face to face manner and at given intervals, a plurality of strip-like partition wall member 23, 23, . . . each formed of a sheet metal of aluminum etcetera or of a sheet resin.

Additionally, like the adsorption element 1 of the fifth embodiment, the adsorption element 1 of the present embodiment is made up of the air ventilation passage forming member 11 made of fiber paper and the pair of the side-plate members 16, 16 each composed of a sheet metal of aluminum etcetera, or of a sheet resin.

When employing the cooling element 2 of such configuration and forming the dehumidification unit $Z_6$ by alternate laminations of the element 2 and the adsorption element 1, all the first air ventilation passages 3, 3, . . . of the adsorption element 1 and all the second air ventilation passages 4, 4, . . . of the cooling element 2 are adjacently formed, with only the side-plate member 16 lying therebetween, as shown in FIG. 14.

Consequently, the dehumidification unit $Z_6$ provides higher heat transfer performance, when compared, for example, with the structure of the conventional dehumidification unit (see FIG. 19) in which all the first air ventilation passages 3 on the side of the adsorption element 1 and all the second air ventilation passages 4 on the side of the cooling element 2 are adjacently formed, with two sheets of plates lying therebetween.

Moreover, when the side-plate member 16 is formed by a sheet metal of aluminum etcetera, the transfer of heat between the air ventilation passage 3 and the air ventilation passage 4 is promoted further when compared with the case in which the side-plate member 16 is formed of fiber paper as in the fourth embodiment, because in the former case such a metal material has a higher heat transfer rate. In addition, because of the absorbent supported directly on the side-plate member 16 of high heat transfer rate, the efficiency of liberation of heat of adsorption generated in the absorbent towards the cooling air (Ab) is also improved.

As a synergistic effect of the above advantages, the dehumidification unit $Z_6$ will have still higher level dehumidification capability.

Furthermore, in the dehumidification unit $Z_6$ of the present embodiment, the cooling element 2 is made up only of the air ventilation passage forming member 21 made up of the plural partition wall members 23, 23, . . . arranged in an opposing manner at predetermined intervals. When compared, for example, to the case where the cooling element 2 is formed using a bending plate member, further weight savings or cost savings are provided. As a result, it becomes possible to provide the dehumidification unit $Z_6$ which is lighter in weight and lower in price.

In addition, since the present embodiment is identical in configuration and operation/working effects of the remaining components other than the above with the first, fourth, and fifth embodiments, their description is omitted here by using the explanation made in each of the first, fourth, and fifth embodiments.

Additionally, in the present embodiment, each of the pair of the side-plate members 16, 16 of the adsorption element 1 corresponds to the "plate member P" as set forth in the claims.

B. Adsorption Element

Next, the structure and others of adsorption elements suitable for use in the foregoing dehumidification units will be described more specifically in conjunction with embodiments.

VII. Embodiment 7

Figure 16:
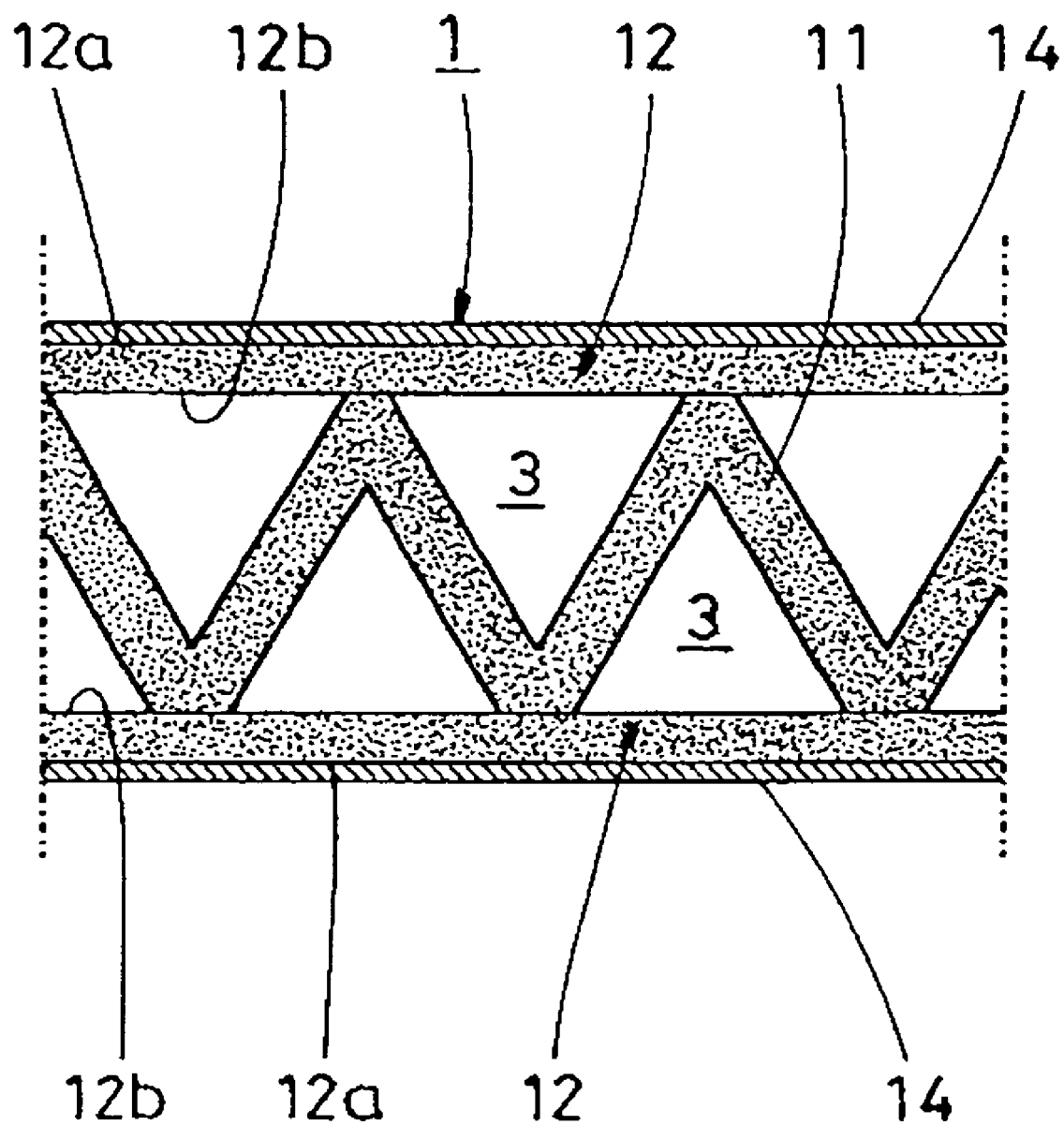
FIG. 16 is a longitudinal sectional view showing in an enlarged manner principal parts of an adsorption element according to a seventh embodiment of the present invention.

Referring to FIG. 16, there is shown an adsorption element 1 formed in accordance with a seventh embodiment of the present invention. The adsorption element 1 of the present embodiment is constructed as follows. The adsorption element 1 is disposed face to face with a cooling element having surfaces neither of which has a waterproofing structure, like the cooling element 2 for use in the dehumidification unit $Z_3$ of the third embodiment. And the adsorption element 1 has a structure suitable for constituting a dehumidification unit together with the cooling element. The adsorption element 1 is shaped like a double-sided cardboard made up of a below-mentioned air ventilation passage forming member 11 and a pair of side-plate members 12, 12.

The air ventilation passage forming member 11 is basically made of a permeable material. In the present embodiment, the air ventilation passage forming member 11 is formed of ceramic fiber paper, glass fiber paper, flame resistant paper, or nonwoven fabric. The air ventilation passage forming member 11 is bent alternately in its thickness direction so that the air ventilation passage forming member 11 is shaped, as a whole, like a corrugated plate.

Like the air ventilation passage forming member 11, each of the pair of the side-plate members 12, 12, is basically formed of a permeable material. In the present embodiment, each side-plate member 12 is formed of ceramic fiber paper, glass fiber paper, flame resistant paper, or nonwoven fabric and is shaped like a flat plate.

And, the air ventilation passage forming member 11 is sandwiched between the pair of the side-plate members 12, 12 from both the sides relative to the plate thickness direction so that they are firmly jointed together and are combined into a single piece. And, in such a combined state of the air ventilation passage forming member 11 and the side-plate members 12, 12, a large number of air ventilation passages 3, 3, . . . extending in parallel with each other are formed by "valley" parts of the air ventilation passage forming member 11 and interior surfaces 12b, 12b of the side-plate members 12, 12 situated face to face with the valley parts.

Additionally, a proper adsorbent, such as silica gel etcetera, is supported on the air ventilation passage forming member 11 and side-plate members 12, 12 combined together by means of a dipping technique or the like, thereby to provide them with a required adsorption capability.

Moreover, separation sheet layers 14, 14 (which correspond to the "waterproofing means 14") are formed on exterior surfaces 12a, 12a of the side-plate members 12, 12, respectively. The separation sheet layer 14 is provided so that, when the dehumidification unit is formed by arranging the cooling element 2 on each side of the adsorption element 1 in a face-to-face manner, it is possible to secure the seal properties between the adsorption element 1 and each cooling element 2. In the present embodiment, the separation sheet layer 14 is formed by attachment of a plastic film to the exterior surface 12a of the side-plate member 12, by application of an organic binder, such as aqueous urethane resin etcetera, to the exterior surface 12a, or by vapor deposition of a metallic material of high heat transfer rate (for example, aluminum, copper etcetera) on the exterior surface 12a.

As mentioned above, the adsorption element 1 of the present embodiment is obtained as follows. An adsorbent is supported on the air ventilation passage forming member 11 and side-plate members 12, 12 which are combined into a single piece shaped like a double-sided cardboard and the separation sheet layers 14, 14 are formed on the exterior surfaces 12a, 12a of the side-plate members 12, 12, respectively. As a result of such arrangement, the following specific operation/working effects are attained.

In the adsorption element 1 of the present embodiment, both the air ventilation passage forming member 11 and the side-plate members 12, 12 are made of a permeable material such as ceramic fiber paper, glass fiber paper, flame resistant paper, or nonwoven fabric, and support thereon an adsorbent, as a result of which the inner surface of each of the air ventilation passages 3, 3 is formed as an adsorbent layer permeable to air. Accordingly, when the air (Aa) to be processed flows through the inside of the air ventilation passages 3, 3, . . . , the to-be-processed air (Aa) easily enters the interior of the adsorbent layer, and the action of adsorption and removal of the moisture contained in the air (Aa) is performed efficiently. As a result, the adsorption element 1 will demonstrate high adsorption performance.

Moreover, because of the arrangement that the air ventilation passage forming member 11 and the side-plate members 12, 12 are each formed of ceramic fiber paper, glass fiber paper, flame resistant paper, or nonwoven fabric, weight and cost savings thereof are, of course, provided when compared to the case where these members are formed from plates of resin or metal and, in addition, especially when ceramic fiber paper or glass fiber paper is used, the use reliability is upgraded by their flame retardancy. Moreover, when using flame resistant paper or nonwoven fabric, there is also an advantage that further cost savings can be attained.

On the other hand, in the adsorption element 1 of the present embodiment, the separation sheet layer 14 is formed on each of the exterior surfaces 12a, 12a of the side-plate members 12, 12. As a result of such arrangement, even if the cooling elements 2, 2 opposite to the exterior surfaces 12a, 12a do not have a waterproofing structure (for example, as in the structure of the cooling element 2 shown in FIG. 7), the seal properties between the adsorption element 1 and the cooling element 2 are secured by the separation sheet layer 14. And the adsorption element 1 will demonstrate high adsorption performance.

Moreover, as described above, the separation sheet layers 14, 14 are provided respectively on the exterior surfaces 12a, 12a of the side-plate members 12, 12 of the adsorption element 1, whereby the seal properties between the adsorption element 1 and the cooling element 2 which faces the adsorption element 1 are secured. This means that there is no need to provide a waterproofing structure on the side of the cooling element 2 facing the exterior surface 12a provided with the separation sheet layer 14. Accordingly, for example, on the side of the cooling element 2, a part or a large part of its side surface member is removed so as to bring the cooling air (Ab) flowing on the side of the cooling element 2 into direct contact with the side-plate member 12 of the adsorption element 1, whereby the efficiency of heat transfer therebetween is still further improved, and further improvement in adsorption performance of the adsorption element 1 can be expected correspondingly.

VIII. Embodiment 8

Figure 17:
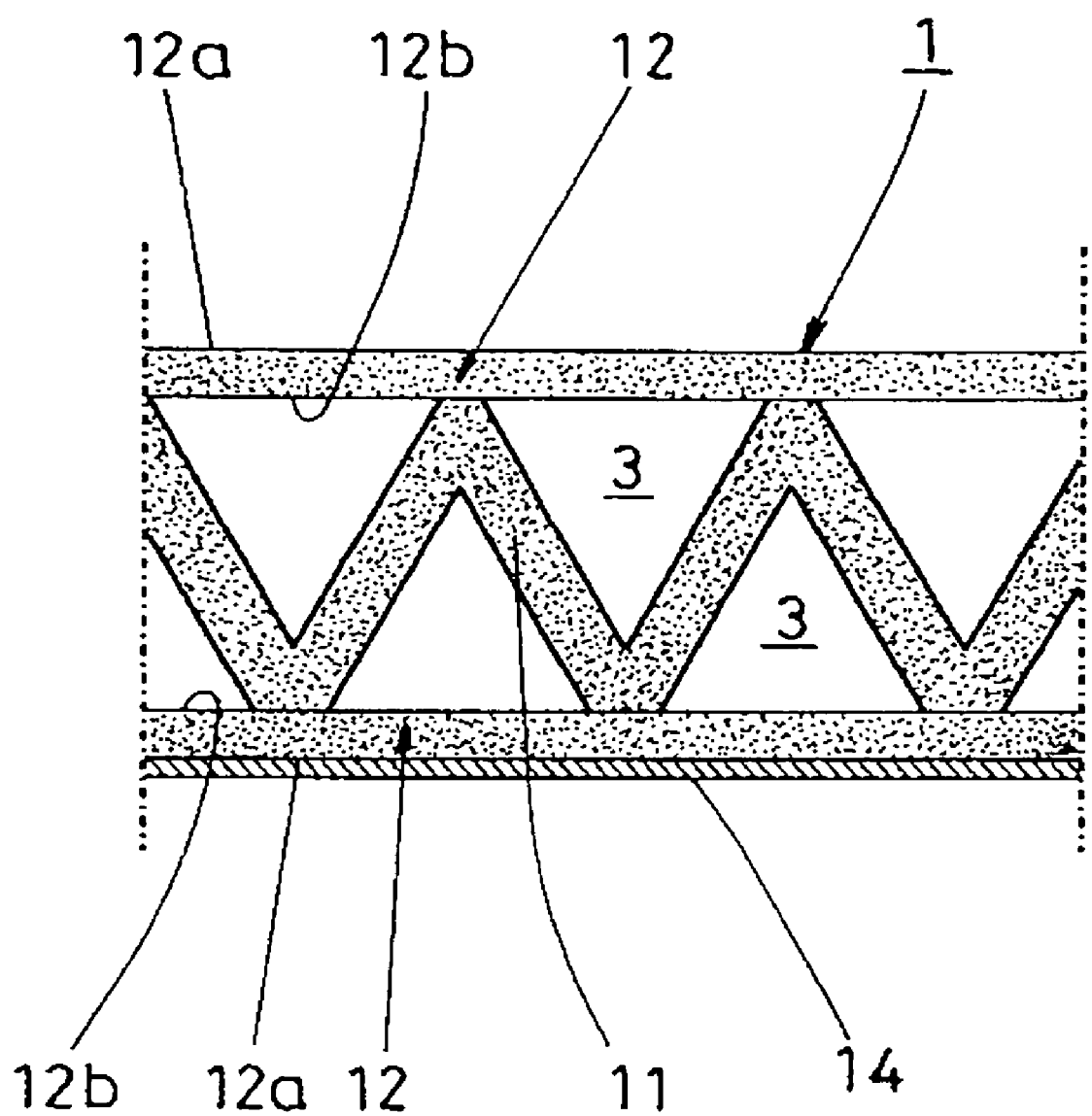
FIG. 17 is a longitudinal sectional view showing in an enlarged manner principal parts of an adsorption element according to an eighth embodiment of the present invention.

Referring now to FIG. 17, there is illustrated an adsorption element 1 formed in accordance with an eighth embodiment of the present invention. The adsorption element 1 of the present embodiment is disposed face to face with a cooling element having surfaces only one of which is provided with a waterproofing structure, such as the cooling element 2 for use in the dehumidification unit $Z_1$ of the first embodiment (see FIG. 2). In addition, the adsorption element 1 has a structure suitable for constituting a dehumidification unit together with such a cooling element. The adsorption element 1 is shaped like a double-sided cardboard made up of an air ventilation passage forming member 11 and a pair of side-plate members 12, 12.

To sum up, the adsorption element 1 of the present embodiment has the same basic construction as the adsorption element 1 of the seventh embodiment, but they differ from each other in the following. In the adsorption element 1 of the seventh embodiment, it is arranged such that each of the exterior surfaces 12a, 12a of the side-plate members 12, 12 is provided with a respective separation sheet layer 14. On the other hand, in the adsorption element 1 of the present embodiment, it is arranged such that the separation sheet layer 14 is provided on only one of the exterior surfaces 12a, 12a of the side-plate members 12, 12 and the other exterior surface 12a remains exposed.

In the adsorption element 1 of the present embodiment, as shown in FIG. 2, the side-plate member 12 on which the separation sheet layer 14 is formed is made to face a surface of the cooling element 2 on which no waterproofing structure is provided (for example, a surface of the cooling element 2 of FIG. 2 on which the side-plate member 22 is not mounted and at which the air ventilation passage forming member 21 is directly exposed), and the side-plate member 12 on which the separation sheet layer 14 is not formed is made to face a surface of the cooling element 2 provided with a waterproofing structure (for example, a surface of the cooling element 2 of FIG. 2 situated on the side of the side-plate member 22) and, as a result of such arrangement, the seal properties between the adsorption element 1 and the cooling element 2 are secured by the separation sheet layer 14 on one side of the adsorption element 1 and by the side-plate member 22 of the cooling element 2 on the other side. Accordingly, the same operation/working effects as accomplished by the adsorption element 1 of the seventh embodiment are attained.

In addition, since the material construction of the air ventilation passage forming member 11 and the side-plate members 12 and the structure of the separation sheet layers 14 are the same as those of the seventh embodiment, their explanation is omitted here.

IX. Embodiment 9

Figure 18:
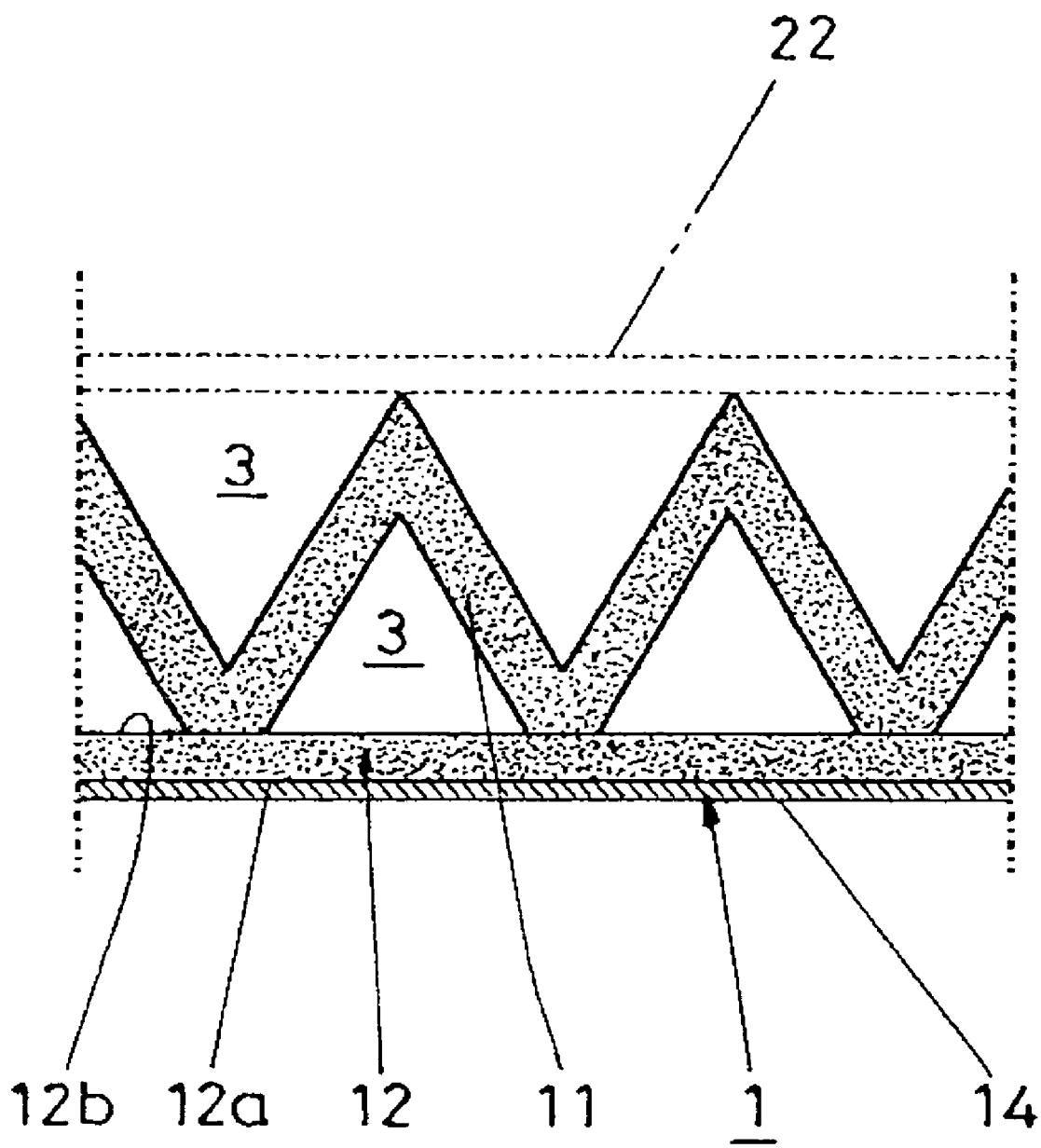
FIG. 18 is a longitudinal sectional view showing in an enlarged manner principal parts of an adsorption element according to a ninth embodiment of the present invention.

Referring to FIG. 18, there is illustrated an adsorption element 1 formed in accordance with a ninth embodiment of the present invention. The adsorption element 1 of the present embodiment is disposed face to face with a cooling element having surfaces only one of which is provided with a waterproofing structure, such as the cooling element 2 for use in the dehumidification unit $Z_2$ of the second embodiment (see FIG. 5). In addition, the adsorption element 1 has a structure suitable for constituting a dehumidification unit together with such a cooling element. Besides, the adsorption element 1 of the present invention is able to secure higher heat transfer efficiency when compared to the adsorption element 1 of the eighth embodiment.

To sum up, the adsorption element 1 of the present embodiment is shaped like a single-sided cardboard made up of an air ventilation passage forming member 11 and a single side-plate member 12, wherein the separation sheet layer 14 is provided on the exterior surface 12a of the side-plate member 12.

In the adsorption element 1 of the present embodiment, as shown in FIG. 5, the side-plate member 12 on which the separation sheet layer 14 is formed is made to face a surface of the cooling element 2 on which no waterproofing structure is provided (for example, a surface of the cooling element 2 of FIG. 5 on which the side-plate member 22 is not mounted and at which the air ventilation passage forming member 21 is directly exposed), and the side-plate member 12 on which the separation sheet layer 14 is not formed is made to face a surface of the cooling element 2 provided with a waterproofing structure (for example, a surface of the cooling element 2 of FIG. 5 situated on the side of the side-plate member 22) and, as a result of such arrangement, the seal properties between the adsorption element 1 and the cooling element 2 are secured by the separation sheet layer 14 on one side of the adsorption element 1 and by the side-plate member 22 of the cooling element 2 on the other side. Accordingly, the same operation/working effects as accomplished by the adsorption element 1 of the seventh embodiment are attained. And, on the side of the adsorption element 1 without the side-plate member 12, the air (Aa) to be processed flowing in the inside of the air ventilation passages 3 is brought into direct contact with the cooling element 2, thereby securing heat transfer efficiency at still higher levels in comparison with the case where the air (Aa) is brought into contact with the cooling element 2 through the side-plate member 12 as in the adsorption element 1 of the eighth embodiment.

In addition, since the material construction of the air ventilation passage forming member 11 and the side-plate members 12 and the structure of the separation sheet layer 14 are the same as those of the seventh embodiment, their explanation is omitted here.

INDUSTRIAL APPLICABILITY

As has been described above, the present invention is usefully applicable to dehumidification units and to adsorption elements for use in such dehumidification units.

What is claimed is:

1. A dehumidification unit comprising alternate laminations of an adsorption element which supports an adsorbent and which is provided with a first air ventilation passage through which air to be processed is passed, and a cooling element which is provided with a second air ventilation passage through which cooling air is passed,
   where said first air ventilation passage of said adsorption element and said second air ventilation passage of said cooling element are adjacently formed, with a single plate member lying between said first air ventilation passage and said second air ventilation passage; and
   wherein said single-plate member is formed of an air and moisture permeable material and an exterior surface of said side-plate member is provided with waterproofing means.

2. A dehumidification unit comprising alternate laminations of an adsorption element which supports an adsorbent and which is provided with a first air ventilation passage through which air to be processed is passed, and a cooling element which is provided with a second air ventilation passage through which cooling air is passed.
   where said first air ventilation passage of said adsorption element and said second air ventilation passage of said cooling element are adjacently formed, with a single plate member lying between said first air ventilation passage and said second air ventilation passage; and
   wherein said plate member is a side-plate member which is made of fiber paper and which constitutes a side wall of said adsorption element relative to the lamination direction thereof,
   said side-plate member directly faces said second air ventilation passage of said cooling element and, in addition, a separation sheet layer configured to prevent the passage of gas and liquid is formed on a surface of said side-plate member on the side of said second air ventilation passage.

3. The dehumidification unit of claim 2, wherein: said plate member is a side-plate member which is formed by a metallic or resinous member and which constitutes a side wall of said cooling element relative to the lamination direction thereof, and
   said side-plate member directly faces said first air ventilation passage of said adsorption element.

4. A dehumidification unit comprising alternate laminations of an adsorption element which supports an adsorbent and which is provided with a first air ventilation passage through which air to be processed is passed, and a cooling element which is provided with a second air ventilation passage through which cooling air is passed,
   where said first air ventilation passage of said adsorption element and said second air ventilation passage of said cooling element are adjacently formed, said adsorption element in which a large number of air ventilation passages are formed on the inside of a single pair of tabular side-plate members spacedely opposed to each other and an absorbent is supported on the side of an interior surface of each of said air ventilation passages; and
   wherein said side-plate members are each formed of an air and moisture permeable material and either or both of exterior surfaces of said side-plate members are provided with waterproofing means.

5. The dehumidification unit of any of claims 1, 2, or 4, wherein:
   an air ventilation passage forming member of said cooling element is formed by a bending plate member shaped like a corrugated plate.

6. The dehumidification unit of any of claims 1, 2, or 4, wherein:
    an air ventilation passage forming member of said cooling element is formed by a bending plate member shaped like a trapezoidally corrugated plate.

7. The dehumidification unit of any of claims 1, 2, or 4, wherein;
    an air ventilation passage forming member of said cooling element is made up of a plurality of partition walls vertically arranged in the thickness direction of said cooling element.

8. The dehumidification unit of claim 2, wherein:
    said separation sheet layer is formed by attachment of a plastic film, by vapor deposition of a metallic material, or by application of an organic binder.

9. An adsorption element in which a large number of air ventilation passages are formed on the inside of a single pair of tabular side-plate members spacedely opposed to each other and an absorbent is supported on the side of an interior surface of each of said air ventilation passages
    wherein:
    said side-plate members are each formed of an air and moisture permeable material, and
    either or both of exterior surfaces of said side-plate members are provided with waterproofing means.

10. An adsorption element in which a large number of air ventilation passages are formed at an interior surface of a tabular side-plate member and an absorbent is supported on the side of an interior surface of each of said air ventilation passages
    wherein:
    said side-plate member is formed of an air and moisture permeable material, and an exterior surface of said side-plate member is provided with waterproofing means.

11. The adsorption element of claim 9 or claim 10, wherein:
    as said permeable material of which said side-plate member is formed, ceramic fiber paper, glass fiber paper, flame resistant paper, or nonwoven fabric is used.

12. The adsorption element of claim 9 or claim 10, wherein:
    said waterproofing means is formed by attachment of a plastic film to said exterior surface of said side-plate member, by application of an organic binder to said exterior surface, or by vapor deposition of a metallic material on said exterior surface.

13. The adsorption element of claim 9 or claim 10, wherein:
    said waterproofing means is partially provided only in a corresponding area of said exterior surface of said side-plate member to a non waterproofing structure portion of said cooling element which faces said exterior surface.

\* \* \* \* \*